Jan. 1, 1963 P. H. CARTER ETAL 3,070,933
MACHINE FOR MANUFACTURING NOVELTY ICE CREAM PRODUCTS
Filed May 26, 1959 20 Sheets-Sheet 2

INVENTORS
PAUL H. CARTER
THOMAS E. MARION
RAYMOND L. MORSE

BY Albert J. Kramer
ATTORNEY

Jan. 1, 1963 P. H. CARTER ETAL 3,070,933
MACHINE FOR MANUFACTURING NOVELTY ICE CREAM PRODUCTS
Filed May 26, 1959 20 Sheets-Sheet 3
FIG. 37.
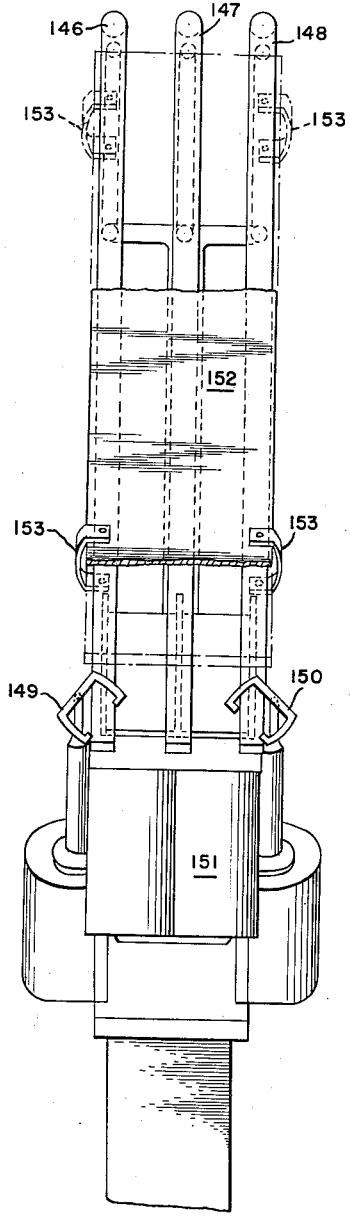
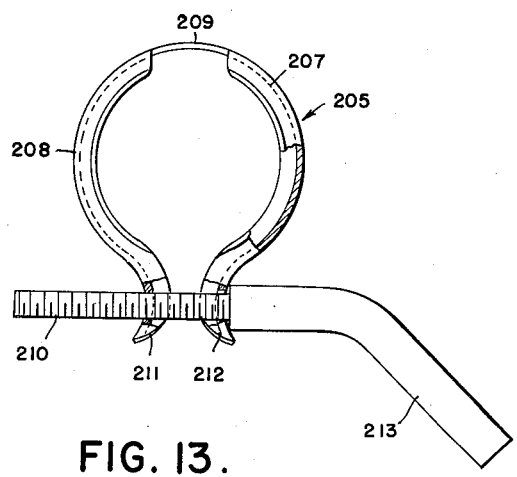
FIG. 13.
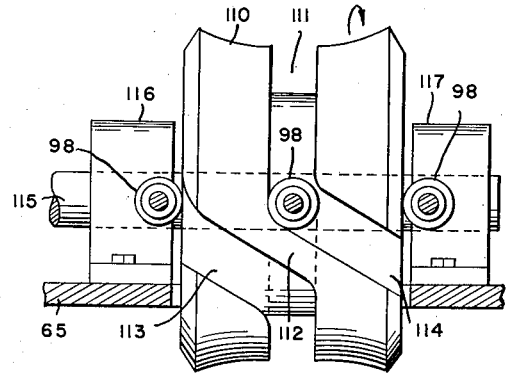
FIG. 3A.
INVENTORS
PAUL H. CARTER
THOMAS E. MARION
RAYMOND L. MORSE
BY *Albert J. Kramer*
ATTORNEY

INVENTORS.
PAUL H. CARTER
THOMAS E. MARION
RAYMOND L. MORSE

Jan. 1, 1963     P. H. CARTER ETAL     3,070,933
MACHINE FOR MANUFACTURING NOVELTY ICE CREAM PRODUCTS
Filed May 26, 1959     20 Sheets-Sheet 5

INVENTORS
PAUL H. CARTER
THOMAS E. MARION
RAYMOND L. MORSE
BY
Albert J. Kramer
ATTORNEY Jan. 1, 1963 P. H. CARTER ETAL 3,070,933
MACHINE FOR MANUFACTURING NOVELTY ICE CREAM PRODUCTS
Filed May 26, 1959 20 Sheets-Sheet 6

INVENTORS
PAUL H. CARTER
THOMAS E. MARION
RAYMOND L. MORSE

BY *Albert J. Kramer*
ATTORNEY

Jan. 1, 1963 P. H. CARTER ETAL 3,070,933
MACHINE FOR MANUFACTURING NOVELTY ICE CREAM PRODUCTS
Filed May 26, 1959 20 Sheets-Sheet 7

INVENTORS
PAUL H. CARTER
THOMAS E. MARION
RAYMOND L. MORSE

BY *Albert J. Kramer*
ATTORNEY

Jan. 1, 1963   P. H. CARTER ETAL   3,070,933
MACHINE FOR MANUFACTURING NOVELTY ICE CREAM PRODUCTS
Filed May 26, 1959   20 Sheets-Sheet 9

INVENTORS
PAUL H. CARTER
THOMAS E. MARION
RAYMOND L. MORSE
BY
Albert J. Kramer
ATTORNEY

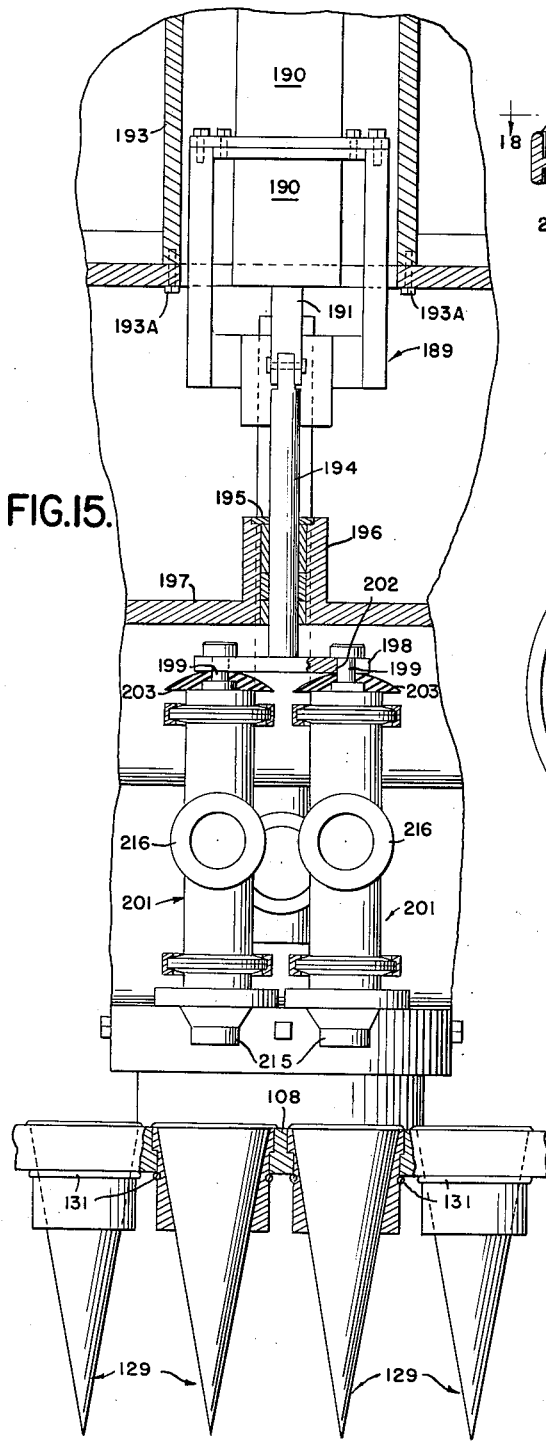

Jan. 1, 1963 P. H. CARTER ETAL 3,070,933
MACHINE FOR MANUFACTURING NOVELTY ICE CREAM PRODUCTS
Filed May 26, 1959 20 Sheets-Sheet 11

INVENTORS
PAUL H. CARTER
THOMAS E. MARION
BY RAYMOND L. MORSE

Albert J. Kramer
ATTORNEY

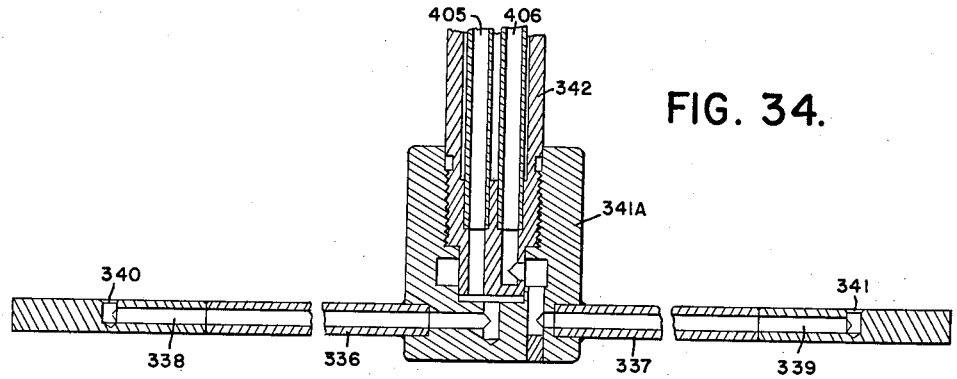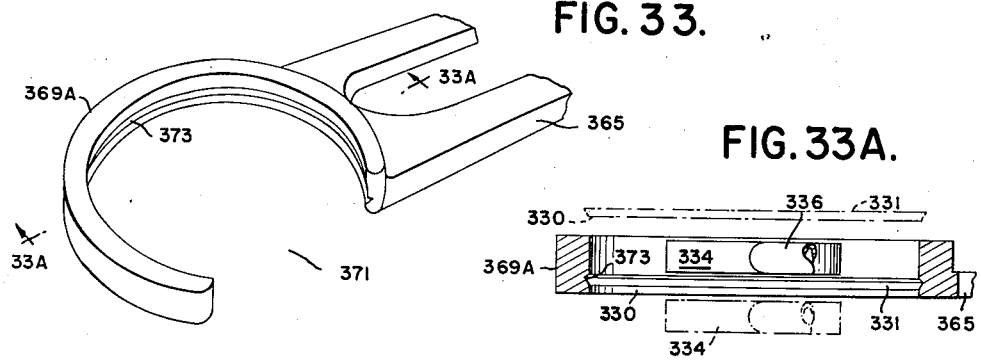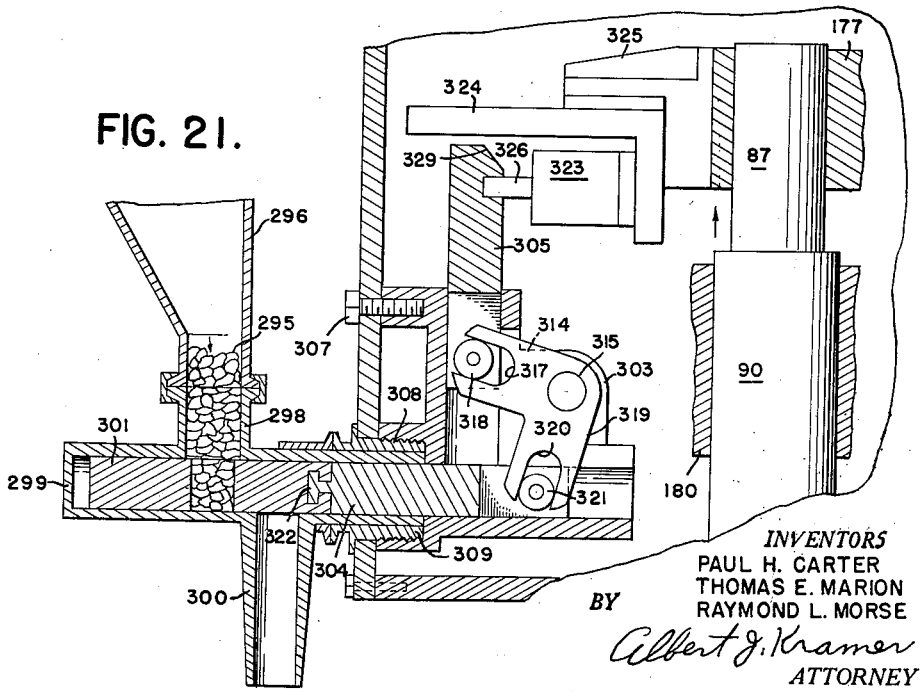

Jan. 1, 1963 P. H. CARTER ETAL 3,070,933
MACHINE FOR MANUFACTURING NOVELTY ICE CREAM PRODUCTS
Filed May 26, 1959 20 Sheets-Sheet 13

INVENTORS
PAUL H. CARTER
THOMAS E. MARION
RAYMOND L. MORSE

BY *Albert J. Kramer*
ATTORNEY

INVENTORS
PAUL H. CARTER
THOMAS E. MARION
RAYMOND L. MORSE
BY Albert J. Kramer
ATTORNEY Jan. 1, 1963  P. H. CARTER ETAL  3,070,933
MACHINE FOR MANUFACTURING NOVELTY ICE CREAM PRODUCTS
Filed May 26, 1959  20 Sheets-Sheet 15

INVENTORS
PAUL H. CARTER
THOMAS E. MARION
RAYMOND L. MORSE
BY
*Albert J. Kramer*
ATTORNEY Jan. 1, 1963    P. H. CARTER ETAL    3,070,933
MACHINE FOR MANUFACTURING NOVELTY ICE CREAM PRODUCTS
Filed May 26, 1959    20 Sheets-Sheet 16

INVENTORS
PAUL H. CARTER
THOMAS E. MARION
RAYMOND L. MORSE
BY Albert J. Kramer
ATTORNEY Jan. 1, 1963     P. H. CARTER ETAL     3,070,933
MACHINE FOR MANUFACTURING NOVELTY ICE CREAM PRODUCTS
Filed May 26, 1959     20 Sheets-Sheet 17
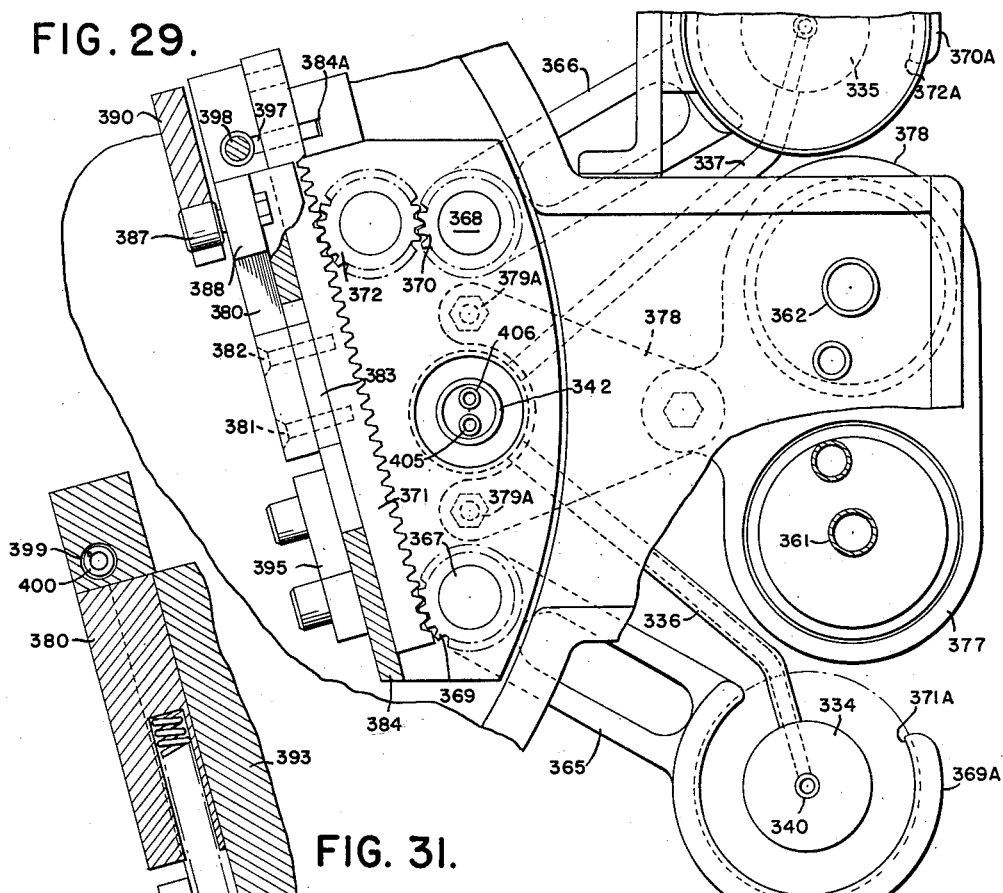
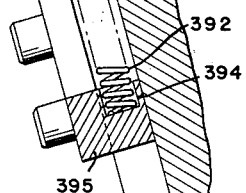
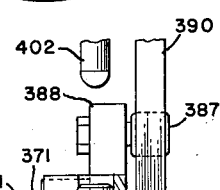
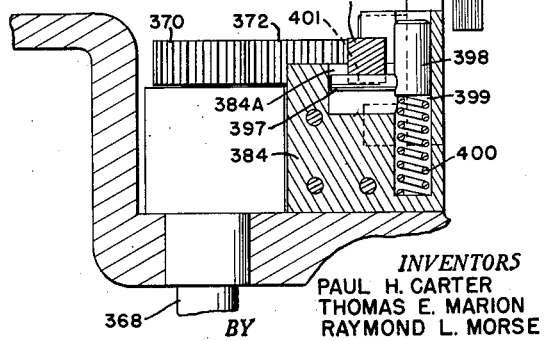
INVENTORS
PAUL H. CARTER
THOMAS E. MARION
RAYMOND L. MORSE
BY Albert J. Kramer
ATTORNEY INVENTORS
PAUL H. CARTER
THOMAS E. MARION
BY RAYMOND L. MORSE
Albert J. Kramer
ATTORNEY Jan. 1, 1963 P. H. CARTER ETAL 3,070,933
MACHINE FOR MANUFACTURING NOVELTY ICE CREAM PRODUCTS
Filed May 26, 1959 20 Sheets-Sheet 19
FIG. 38.
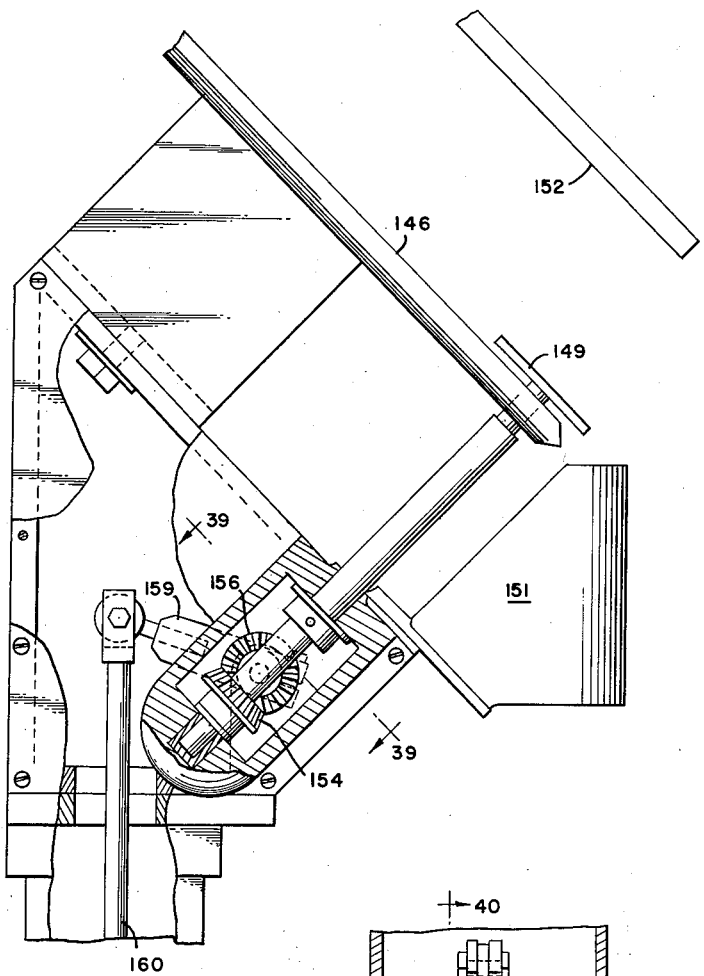
FIG. 40.
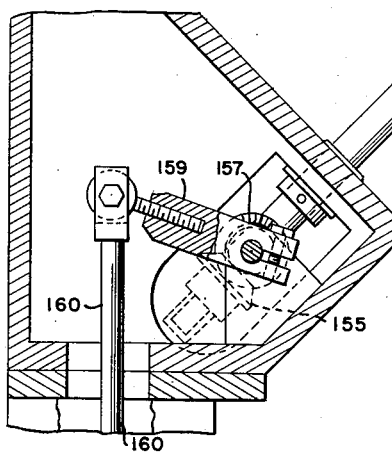
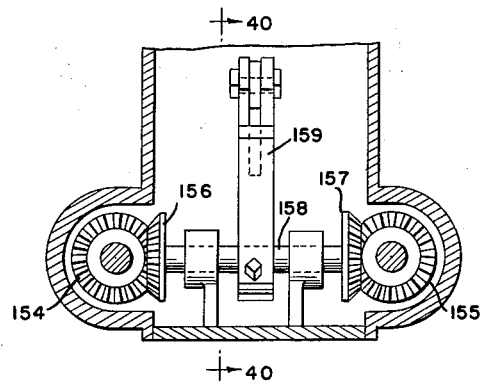
FIG. 39.
INVENTORS
PAUL H. CARTER
THOMAS E. MARION
RAYMOND L. MORSE
BY *Albert J. Kramer*
ATTORNEY

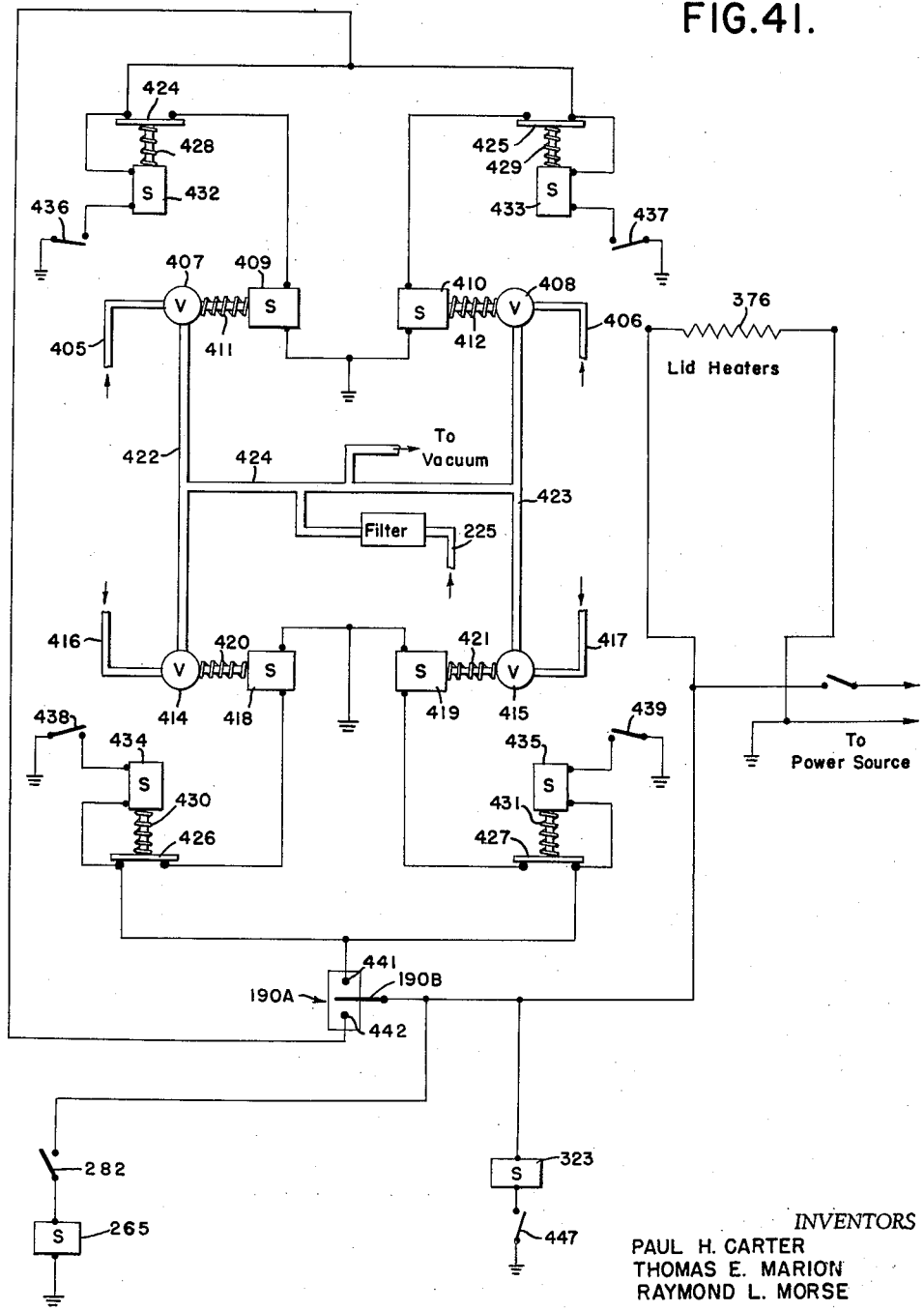

United States Patent Office 3,070,933
Patented Jan. 1, 1963

3,070,933
MACHINE FOR MANUFACTURING NOVELTY
ICE CREAM PRODUCTS
Paul H. Carter, Thomas E. Marion, and Raymond L.
Morse, Baltimore, Md., assignors to Universal Machine
Co., Inc., Baltimore, Md., a corporation of Maryland
Filed May 26, 1959, Ser. No. 815,883
7 Claims. (Cl. 53—282)

This invention relates to material handling devices and it is more particularly concerned with machines for manufacturing confectionary products.

An object of the invention is the provision of a machine for manufacturing ice cream novelty products comprising ice cream and one or more topping materials in a receptacle.

Another object of the invention is the provision of a machine which is capable of separately receiving ice cream, ice cream receptacles, and other confectionary materials to be used in the manufacture of the novelty product, and assembling unit quantities of each to form the desired product.

A further object of the invention is the provision of a machine of the type mentioned having sanitation features that reduce to a minimum the probability of contamination of the product from external sources.

A still further object of the invention is the provision of such a machine which is automatic in the various steps of manufacturing the final product from the separate materials used.

A still further object of the invention is the provision of a machine of the type mentioned which can receive ice cream containers, feed the containers to a rotating turret, fill the containers at different stations about the turret with measured quantities of confectionary products, such as ice cream, chocolate topping, nuts, etc., seal the container, and discharge the sealed container as a unit product.

A still further object of the invention is the provision of such a machine which can operate on more than one container simultaneously in all operations, thus producing with one machine a volume of finished products in a given period that would otherwise require more than one machine.

These and still other objects, advantages, and features of the invention will appear more fully from the following description considered together with the accompanying drawing wherein an embodiment of the invention is illustrated.

In the drawing:

FIG. 3A (sheet 3) is a section along the line 3A—3A of FIG. 3.

FIG. 13 (sheet 3) is a side view of one of the flange lock rings, partly broken away, used to quickly couple and uncouple various sections of the machine as a sanitation measure.

FIG. 15 (sheet 11) is a section along the line 15—15 of FIG. 14.

FIG. 16 (sheet 11) is a section along the line 16—16 of FIG. 14.

FIG. 17 (sheet 11) is an enlarged view of a portion of the nozzle as shown in FIG. 14.

FIG. 18 (sheet 11) is a section along the line 18—18 of FIG. 17.

FIG. 21 (sheet 13) is a view similar to FIG. 19 with the mechanism in loading position.

FIG. 29 (sheet 18) is a view generally similar to FIG. 27 with the parts in different positions.

FIGS. 30, 31 and 32 (sheet 18) and FIG. 33 (sheet 13) are fragmentary views showing details of some of the parts of the mechanism of the lid unit.

FIG. 33A (sheet 13) is a section along the line 33A—33A of FIG. 33.

Figure 26:
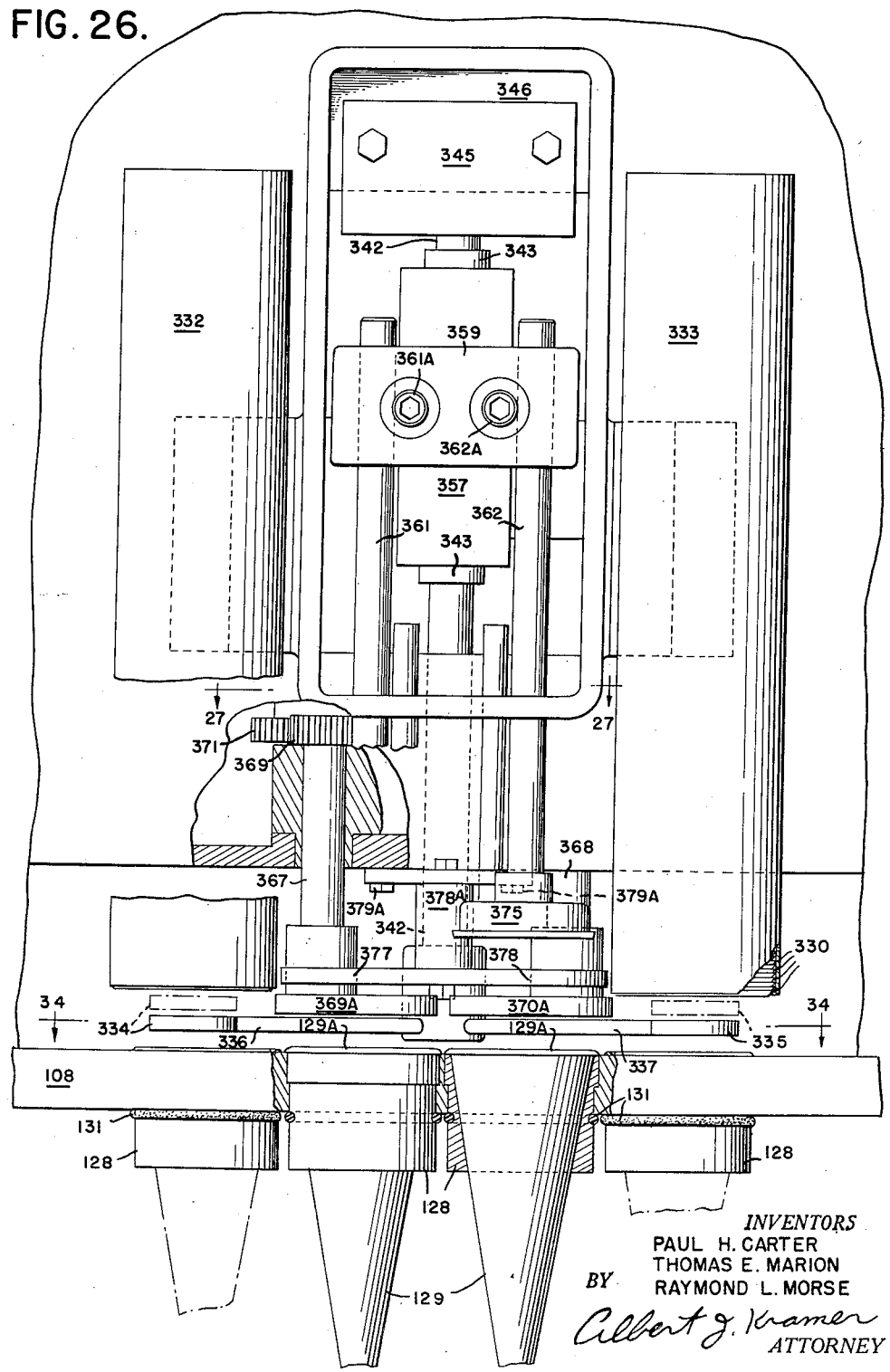
FIG. 26 (sheet 16) is a front elevational view of the lid holders, transfer mechanism, and applicator unit, partly in section.
Figure 27:
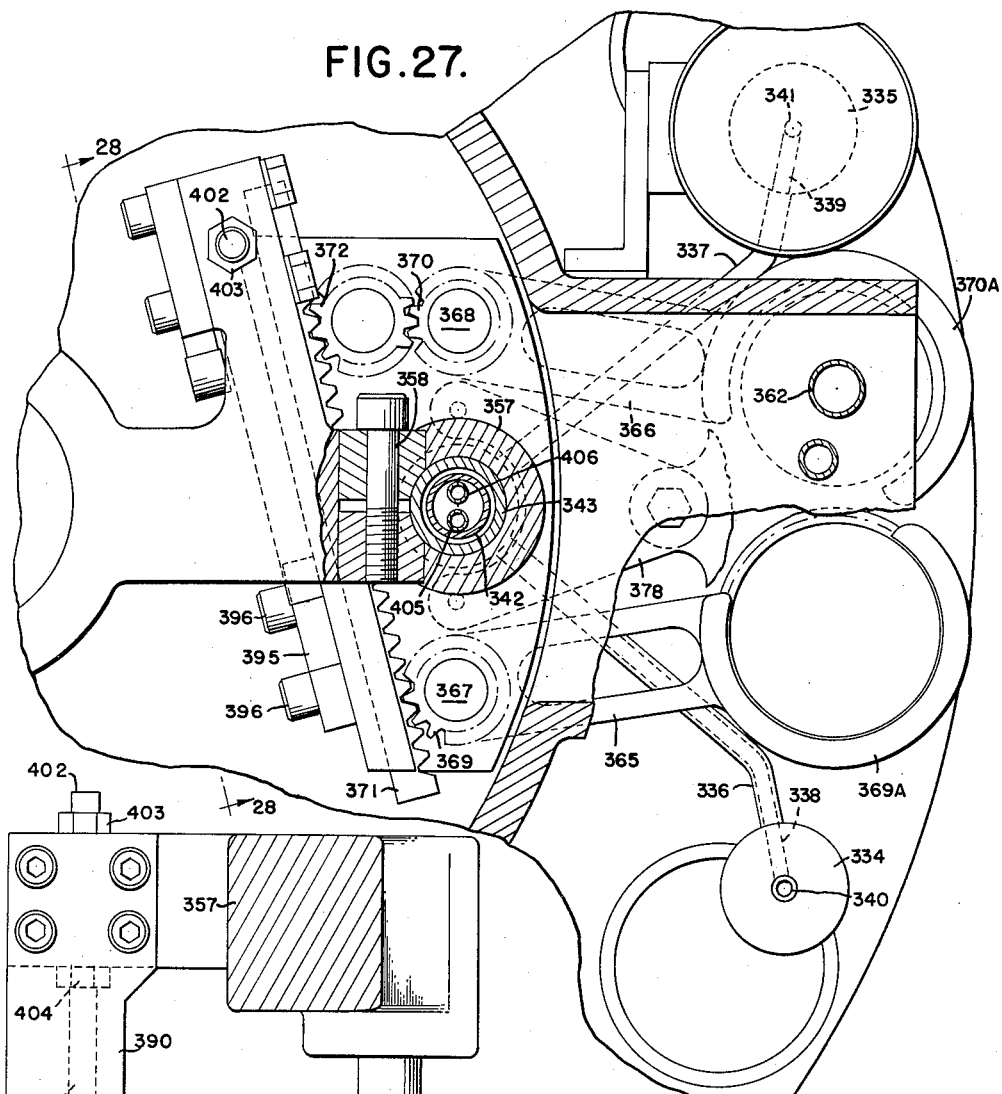
FIG. 27 (sheet 17) is a sectional view along the line 27—27 of FIG. 26.

FIG. 34 (sheet 13) is a section on the line 34—34 of FIG. 26.

Figure 4:
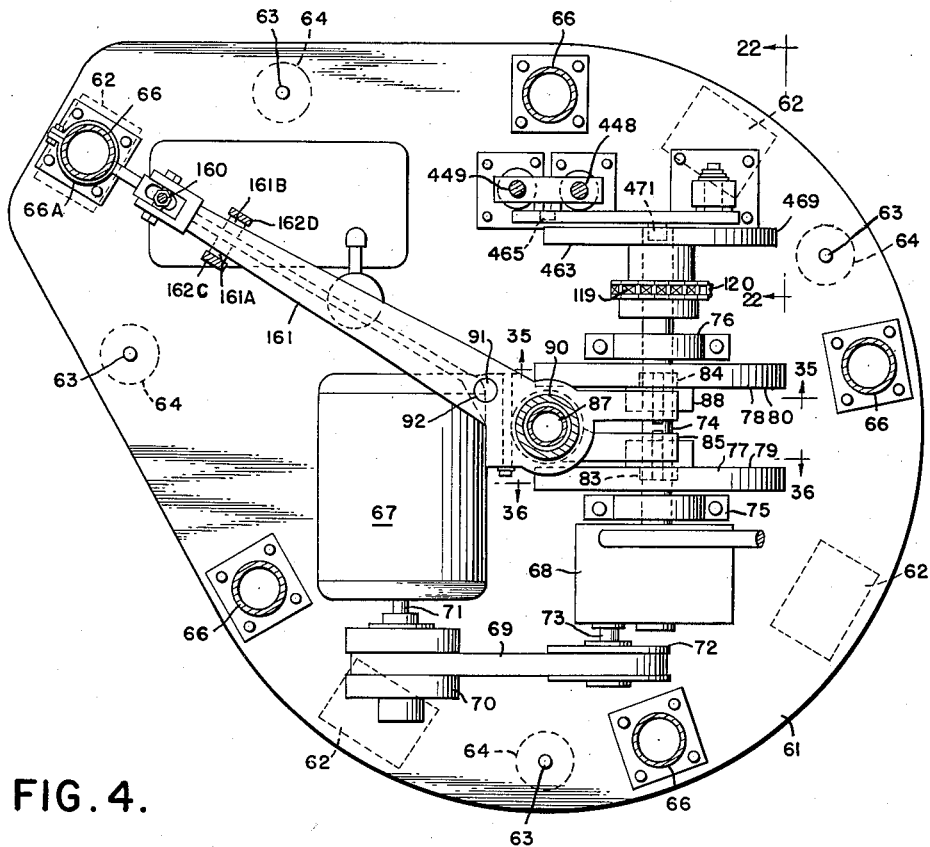
FIG. 4 (sheet 5) is a horizontal sectional view along the line 4—4 of FIG. 1.
Figure 5:
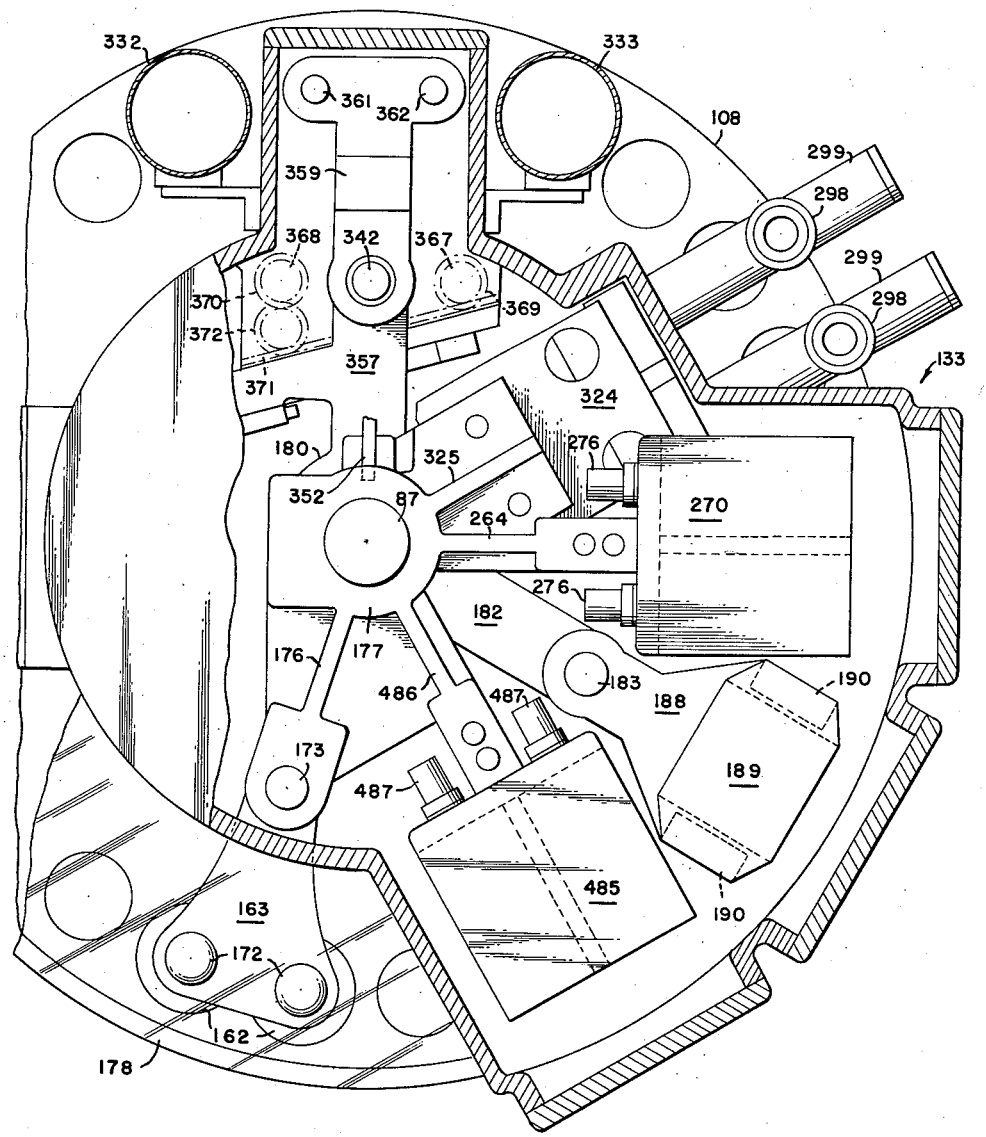
FIG. 5 (sheet 6) is a top plan view of the head section, partly broken away, generally along the line 5—5 of FIG. 1 on a larger scale.
Figure 6:
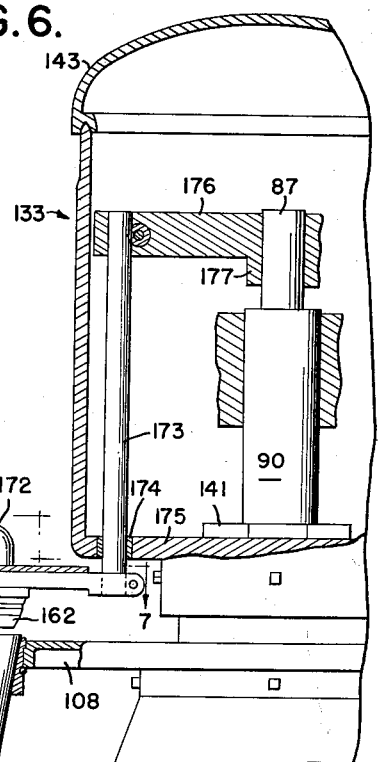
FIG. 6 (sheet 7) is a vertical sectional view of a fragmentary portion of the head and loading wheel showing parts of the receptacle seaters.
Figure 7:
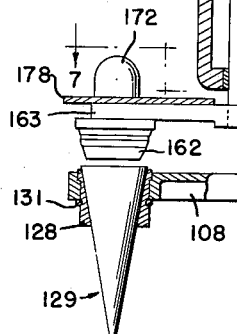
FIG. 7 (sheet 7) is a top plan view of a fragmentary portion along the line 7—7 of FIG. 6.
Figure 35:
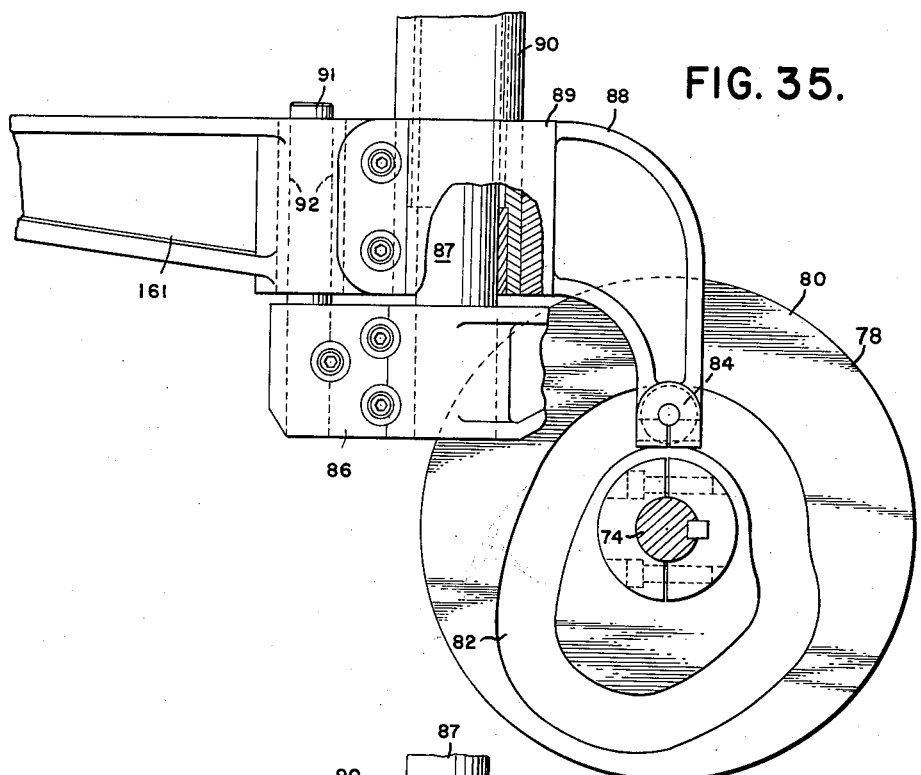

FIG. 35 (sheet 19) is a section along the line 35—35 of FIG. 4 on a larger scale.

Figure 36:
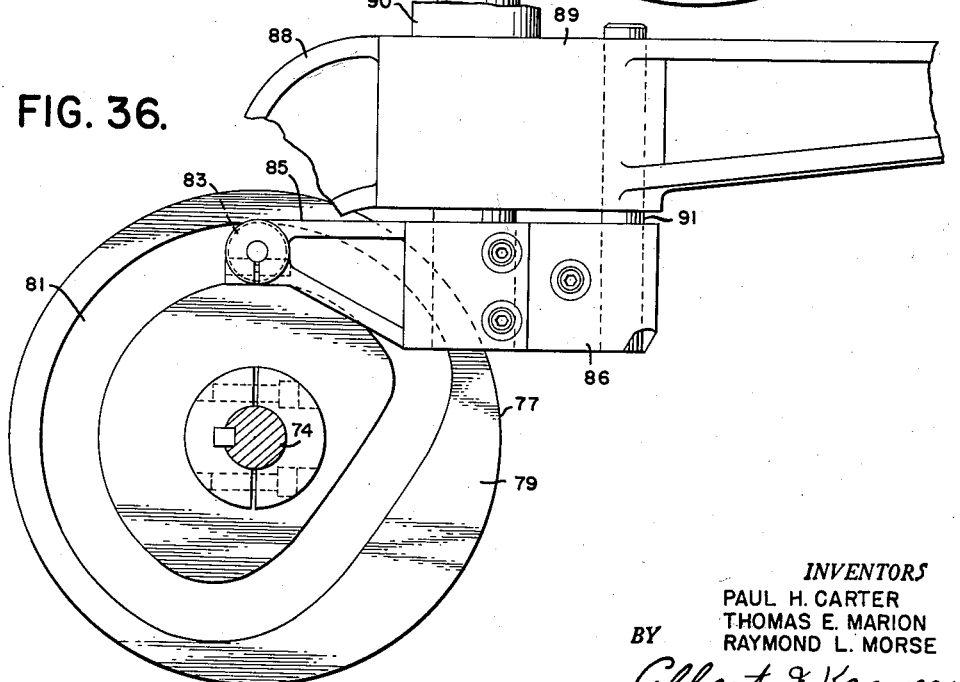

FIG. 36 (sheet 19) is a section along the line 36—36 of FIG. 4 on a larger scale.

FIG. 37 (sheet 3) is an inner end view of the receptacle feeding unit, partly broken away.

FIG. 38 (sheet 4) is a side elevational view, partly in section, of a fragmentary portion of the receptacle feeding unit.

FIG. 39 (sheet 4) is a section along the line 39—39 of FIG. 38.

FIG. 40 (sheet 4) is a section along the line 40—40 of FIG. 39.

FIG. 41 (sheet 20) is a combined pneumatic and wiring diagram relating to certain elements of the embodiment.

Figure 42:
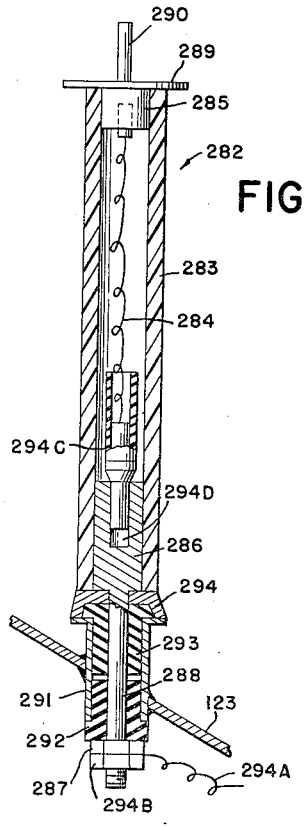
Figure 3:
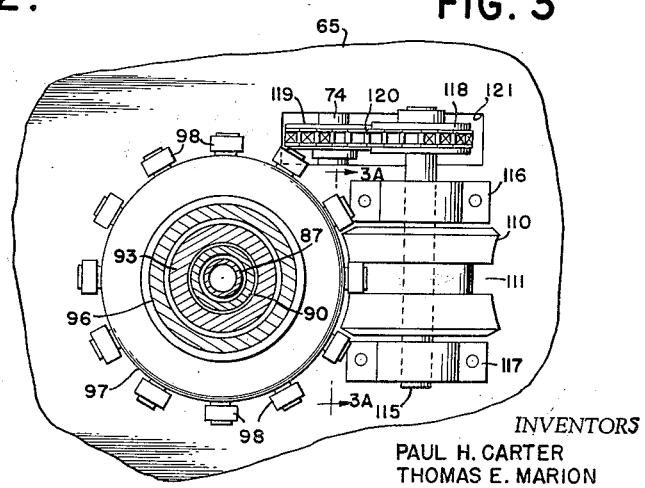
FIG. 3 (sheet 2) is a horizontal sectional view along the line 3—3 of FIG. 1.

FIG. 42 (sheet 2) is a longitudinal sectional view of one of the shielded flexible conductor post members.

Referring with more particularity to the drawing, in which like numerals designate like parts, throughout the various views, the embodiment illustrated comprises, generally, a portable machine built on a suitable frame structure, including a bottom shelf 61 to which ground rollers or casters 62 are mounted.

To hold the machine level in any given position, leveling screws 63 are threadedly engaged with the shelf 61 and thereby can be lowered in contact with the floor when it is desired to secure the machine in a fixed position, or raised when it is desired to move the machine from one location to another. A knurled knob 64 is provided for each of these leveling screws to facilitate the manual adjustment thereof.

Above the bottom shelf 61, there is disposed an upper shelf 65 which is supported on stanchions or pillars 66 secured to and rising from the shelf 61.

An electric motor 67 is secured to the bottom shelf 61 and is connected to a speed reducer 68 by a belt 69 engaging a pulley 70 on the take-off shaft 71 of the motor and pulley 72 of input shaft 73 of the speed reducer.

The output shaft 74 of the speed reducer is supported by a pillow block bearing 75 and 76 and it is keyed to a pair of cam wheels 77 and 78 between the bearings 75 and 76. The inner faces 79 and 80 of the cam wheels are provided with continuous cam grooves 81 and 82, respectively. The shape of these grooves are geometrically non-descriptive, but are substantially as illustrated in the FIGS. 36 and 37.

Each groove 81 and 82 is provided with a cam follower in the form of a roller 83 and 84, respectively.

The roller 83 is carried at the end of an arm 85 which is integral with a bracket 86 fixed to the lower end of a hollow vertical inner shaft 87. The roller 84 is carried at the end of an arm 88 which is integral with a bracket 89 fixed to the lower end of a hollow outer vertical shaft 90. The shaft 87 is slidably disposed in the shaft 90 and the brackets 86 and 89 are in substantial alignment.

A guide pin 91 is secured to the lower bracket 86 and it projects upwardly into a vertical aperture 92 of the upper bracket 89.

By these means movements of the shafts 87 and 90 are effected relative to each other and also relative to any stationary parts of the machine to provide the various drives needed.

Figure 1:
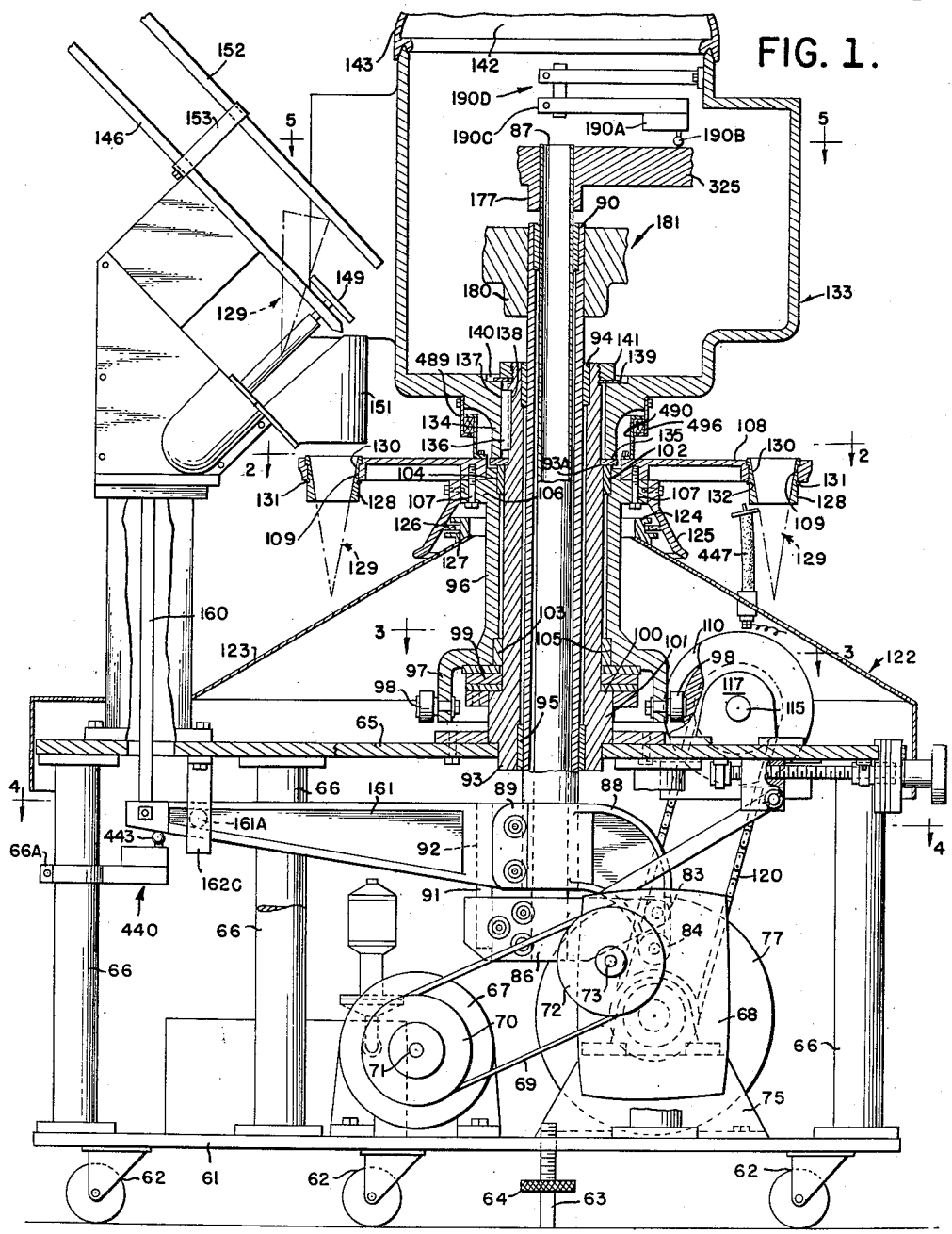
FIG. 1 (sheet 1) is a vertical sectional view through an embodiment of the invention, partly broken away, some parts being removed completely.

The outer shaft 90 with the inner shaft 87 disposed therein, passes upwardly through a central stationary hollow column 93. This column rests on and it is secured to the upper shelf 65. Upper bushing 94 and lower bushing 95 are secured to the inner side of the column 93 for slidable contact with the shaft 90, as shown in FIG. 1.

Surrounding the lower portion of the column 93 is a cylindrical shell 96, the bottom of which is flared as a skirt to provide an offset annular portion 97 to which there are attached number of rollers 98.

The shell 96 is rotatable on the column 93 and is supported thereon by a thrust bearing 99 on an upwardly facing annular shoulder 100 formed by an enlarged section or boss 101 of the column. Upper and lower spacing rings or bearings 102 and 103 are disposed between the column 93 and recesses 104 and 105 respectively, of the shell 96.

Figure 2:
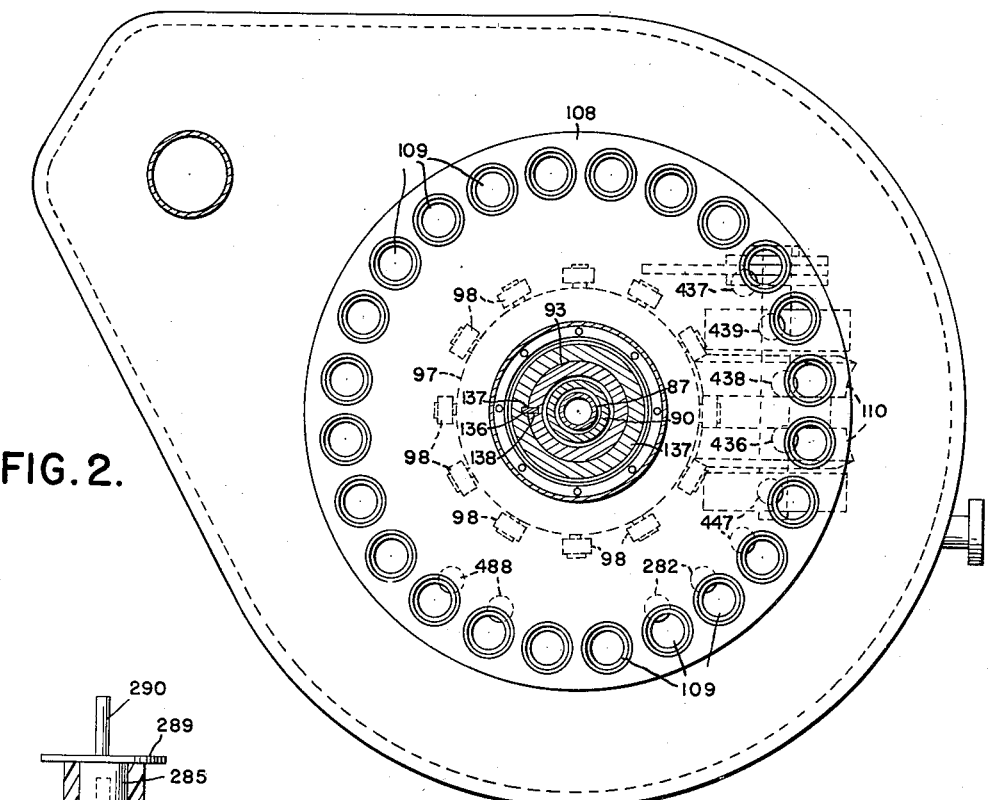
FIG. 2 (sheet 2) is a horizontal sectional view along the line 2—2 of FIG. 1.

The upper end of the shell 96 is provided with an annular flange 106 to which is secured by bolts 107 a horizontal loading wheel 108. The wheel 108 is provided at its periphery with a series of circumferentially spaced apertures 109. These apertures are related to the rollers 98 such that there are two apertures for each roller. (See FIG. 2.) This basic relationship, as will appear more fully hereinafter, permits the operation of the machine in a two fold or twin capacity.

On the upper shelf 65 there is mounted adjacent the skirt 97, a barrel offsetting cam 110 to engage the rollers 98 and rotate the wheel 108 intermittently. This cam generally comprises an annular groove 111 containing an inclined abutment 112 for the rollers 98 in relation to an inlet slot 113 on one side and an outlet slot 114 on the other for the rollers 98 to enter, negotiate, and then leave the groove 111 on each revolution of the cam. Thus, on each revolution of the cam, the wheel 108 is rotated an amount corresponding to the space between successive rollers.

The cam 110 is mounted on a shaft 115 for rotation therewith and this shaft is rotatably mounted in pillow block bearings 116 and 117 on the shelf 65 which bearings straddle the said cam. The shaft 115 extends beyond the bearing 116 and is secured to a sprocket wheel 118. Another sprocket wheel 119 on the output shaft 74 of the speed reducer 68 is geared to the sprocket wheel 118 by a sprocket chain 120. A slot 121 in the shelf 65 is provided for the sprocket chain.

A stationary hood 122 overlies the cam 110 and rollers 98 and has a roof 123 which slopes downwardly and outwardly from a collar 124 disposed beneath the flange 106. Said flange 106 is provided with a skirt 125 which projects downwardly and outwardly about the collar 124 and has an inner annular rib 126 extending from its sloping wall to the interior of an annular groove 127 on the side of the collar 124. The hood 122 is independently supported of the skirt 125 by being attached to the plate 65 by means not shown.

Within each of the apertures 109 there is removably disposed an adapter 128 in the general form of a hollow cylinder, the interior wall of which is shaped to fit the receptacle to be used with the machine. The embodiment illustrated is adapted for use with conical receptacles 129, and, hence, the interior walls 130 of the adapters 128 are frusto-conical, as shown. These adapters are removably held in position by rubber ring retainers 131 engaging corresponding grooves 132 of the adapters just below the wheel 108.

On the upper end of the post 93 there is mounted a hollow stationary crown or head piece 133 about the upper ends of the shafts 87 and 90. The crown 133 has a downwardly projecting neck portion 134 which encircles and is keyed to the upper end of the post 93. It rests upon a bearing ring 135 that is supported on an annular shoulder 93A of the post 93. A vertical key 136 is disposed in adjacent slots 137 and 138 of the neck and post, respectively. A sealing ring or washer 139 is disposed in a recess 140 at the top of the neck and a holding nut 141 is threadedly engaged with the upper tip of the post 93 against the sealing ring 139.

The upper end of the crown 133 has a top access opening 142 covered by a removable lid 143.

At various position about the loading wheel 108 auxiliary mechanisms are provided for feeding the receptacles 129 to the loading wheel and depositing them in the adapters 128, then filling the receptacles with desired confectionary materials, such as one or more flavors of ice cream; topping, such as chocolate syrup, crushed nuts, etc.; then sealing the contents in the receptacles and discharging the final resulting product. The discharge products may then be placed in storage.

Although the invention may be adapted to many variations in the type of receptacles used, such as ice cream cones, paper cups, etc., and in the confectionary materials placed therein, it will, for illustrative purposes, be described hereinafter with respect to conical paper jackets 144 in which there is disposed an edible pastry cone 145 and means for dispensing therein ice cream, chocolate syrup and crushed nuts. It is to be understood, however, that such means are only illustrative of the invention and of the materials with which it may be used. They are not to be regarded as limiting the scope of the invention. For example, the machine could be operated to deposit the confectionary materials directed into a conical or frusto-conical paper receptacle instead of into a paper jacketed pastry cone. Also, various syrups, instead of or in conjunction with chocolate syrup may be dispensed, such as caramel, butterscotch, etc.

The embodiment illustrated, as mentioned above, is designed for dual operations, two receptacles being operated upon simultaneously at each station. This also is to be considered as illustrative only, rather than limiting the scope of the invention.

Receptacle Feeder

To feed the receptacles to the loading wheel, there is provided in accordance with the device described in pending application Ser. No. 770,113, filed October 20, 1949, now U.S. Patent No. 3,028,029, an inclined slideway consisting of spaced parallel bars 146, 147 and 148 and oscillating escapement arms 149 and 150 at the bottom of the slideway to serially discharge the receptacles onto the loading wheel. A shield or diverter 151 is disposed over the wheel to guide the receptacles into proper position on the wheel and a retainer plate 152 is supported on brackets 153 parallel to the bars 146, 147 and 148 to keep the receptacles in position on the bars.

The escapement arms 149 and 150 are oscillated through a linkage consisting of bevel gears 154, 155 and 156, 157, oscillating shaft 158, radial arm 159 and vertically reciprocating shaft 160. The lower end of the shaft 160 is connected to a horizontal arm 161 which, in turn, is connected to bracket 89 and extends radially therefrom. The outer end of the arm 161 is provided with shoes 161A and 161B on opposite sides of the arm which slidably contact and move between a pair of vertical bars 162C and 162D that are bolted to and depend from the bottom of plate 65.

Receptacle Seaters

Figure 8:
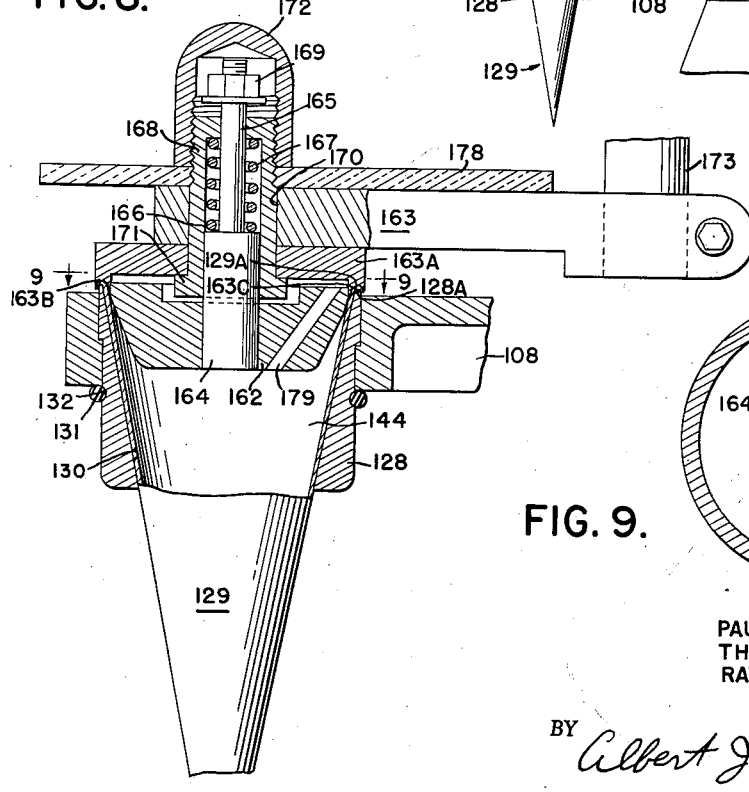
FIG. 8 (sheet 7) is a cross-sectional view along the line 8—8 of FIG. 7, on a larger scale, partly broken away.
Figure 9:
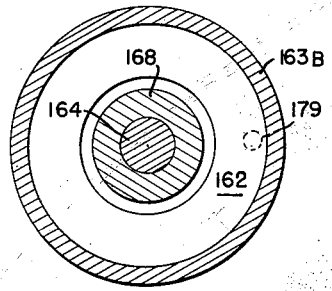
FIG. 9 (sheet 7) is a top plan view along the line 9—9 of FIG. 8.

After the receptacles are deposited in the cups, they are firmly seated therein by seating blocks 162 resiliently carried on the flared outer end of a horizontal arm 163. Each block 162 has an upwardly extending stem 164 and an integral shank 165 of smaller diameter thereabove, forming an upwardly facing shoulder 166 for the lower end of a coil spring 167. An inverted cup 168 is disposed over the shank, spring and stem, the upper end of the spring resting against the top of the cup and the shank passing through an aperture thereof to receive a holding nut 169. Each cup 168 is held on the arm 163 by passing upwardly through an aperture 170 in the arm and having an engaging flange 171 on the bottom and a threaded dome cap 172 at the top. Between the flange 171 and the bottom of the arm 163 there is disposed an annular plate 163A having a downwardly protruding rim edge 163B the bottom surface of which has an annular groove 163C to engage the edge of the receptacle 129 and curl it over the upper rim edge 128A of the adapter 128. (See FIG. 8.) The resulting beaded edge 129A stiffens the upper edge of the receptacle and facilitates subsequent operations, particularly the lid placement. The inner end of the arm 163 is clamped to a vertical reciprocating shaft 173 passing through a bushing 174 in a horizontal section 175 of the crown 133 and being connected to and carried by an arm 176 projecting radially from a spider hub 177 secured to the upper end of the shaft 87. A transparent plate 178 of a plastic material, such as Lucite or Plexiglas, is secured to the arm 163 by means of the dome caps 172 and extends to cover open receptacles 129 in the adapters 128 on either side in order to prevent foreign objects from falling therein before the receptacles reach the filling units of the machine.

The blocks 162 are shaped to fit inside the upper ends of the jackets 144 above the pastry cups 145 and they are provided with breather holes 179 to avoid the build up of any differential pressure between the jackets and the blocks. For this purpose the rim edge 163B does not form an air tight fit against the side of the block 162.

Ice Cream Dispensers

To the upper end of the outer shaft 90 there is fixedly mounted the hub 180 of another spider 181. Arms of the spider radiate from the hub and one of these arms 182 is fixed to a post 183 by means of a post clamp 184. The post 183 extends downwardly from the arm 182 through an opening 185 in a horizontal wall section 186 of the crown 133 underlying the outer end of the arm 182, to provide the lower portion thereof on the exterior of the crown in a recess formed by the horizontal wall section 186 and an adjacent vertical wall section 187. The other end of the post 183 projects upwardly from the arm 182 to a point adjacent the opening 142.

To the upper end of the post 183, the horizontal arm 188 of a bracket 189 is secured by means of a post clamp 190A. The bracket 189 is secured to and carries a pair of oppositely acting solenoids 190, 190 surrounding a vertical reciprocating armature 191. The solenoids and bracket project upwardly through an opening 192 of the crown 133 and are covered by a hood 193 mounted thereover and secured by bolts 193A to the crown.

The lower end of the armature 191 is pin-connected to the upper end of an inverted connecting T-rod 194 passing through bushings 195 in an aperture sleeve 196 formed in a horizontal portion 197 of the crown underlying the solenoids 190.

The lower end of the rod 194 carries a cross bar 198 which is connected to the necks 199 at the upper ends of plungers 200, 200 each of which forms part of an ice cream dispensing unit 201. The necks 199 fit in slots 202 of the bar 198. Sanitary shields 203 are disposed on the plungers 200 just below the bars 198. The nozzle housing 204 is connected by a flange coupling 205 to a bracket 206 which is mounted on the lower end of the post 183 below the horizontal section 186.

The flange coupling 205 is similar to a number of others used on the machine for effecting rapid coupling and uncoupling of flanged joints and comprises two double-flanged semi-circular sections 207 and 208 hinged together by a flexible section 209 adjacent to and continuous with the inner ends of the sections 207 and 208 and a threaded clamping screw 210 at the outer adjacent ends, between lips 211 and 212 projecting therefrom. The screw 210 has an angular portion 213 to facilitate rotation manually.

Coupling pins 214 are also provided in adjacent cavities of the coupled parts to maintain proper alignment.

By virtue of this mounting arrangement, the nozzle 201 and solenoids 190 as a unit are vertically reciprocated together intermittently by movement of the outer shaft 90 and, at the same time, the plunger 200 thereof can be independently actuated relative to the housing 204 by excitation of the solenoids.

Figure 14:
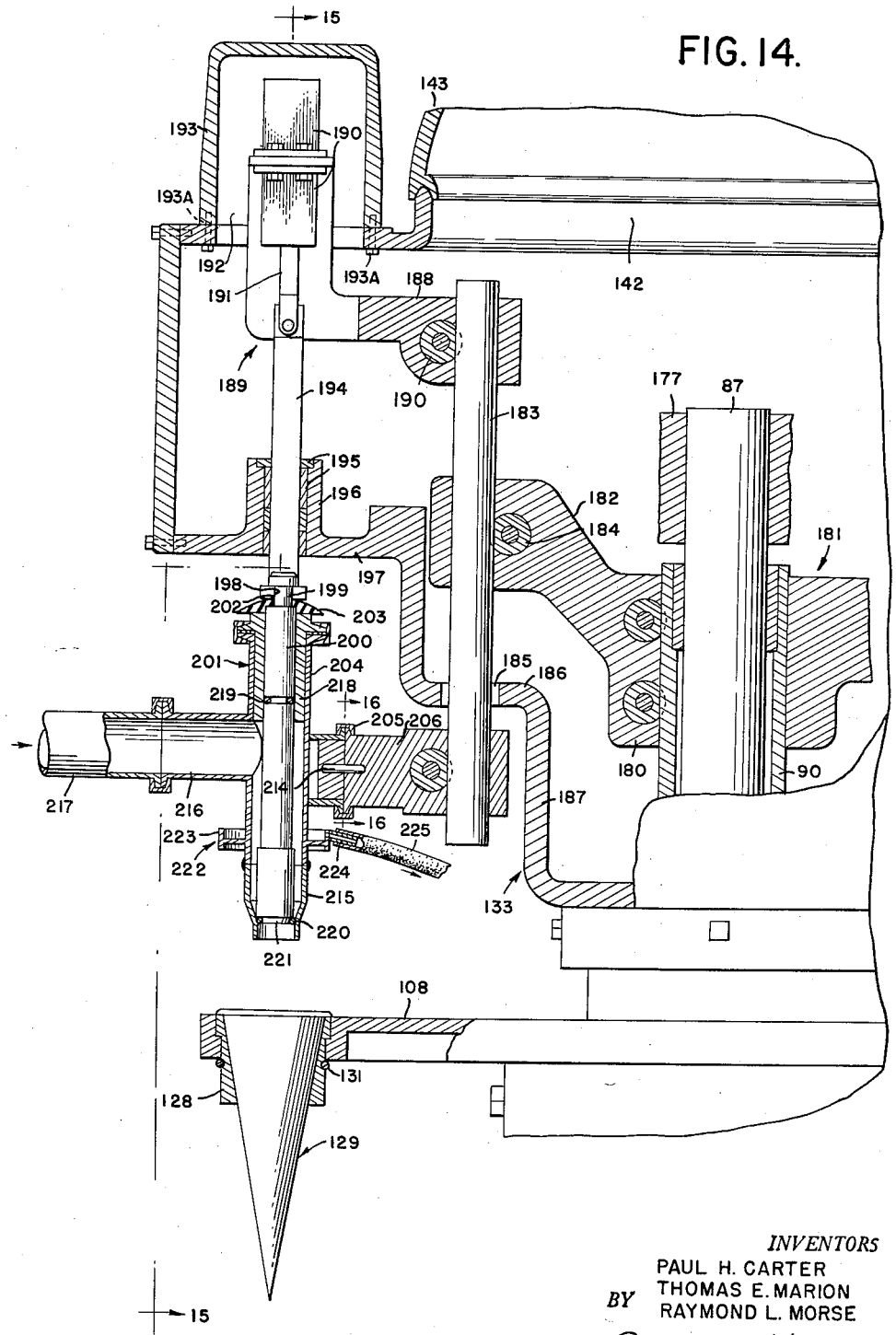
FIG. 14 (sheet 10) is a vertical sectional view of a portion of the head and loading wheel showing parts of the ice cream dispensing means.
Figure 20:
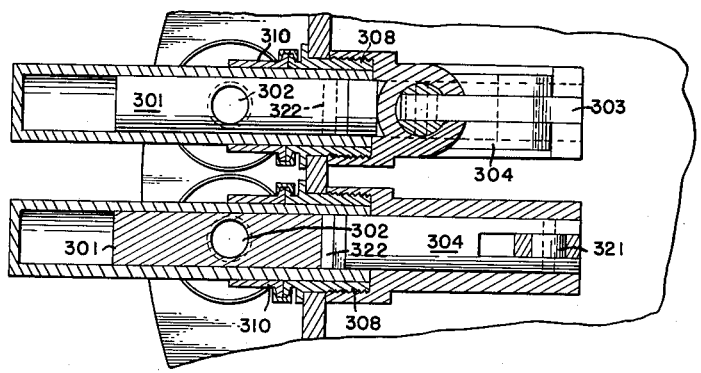
FIG. 20 (sheet 12) is a sectional view generally along the line 20—20 of FIG. 19.
Figure 19:
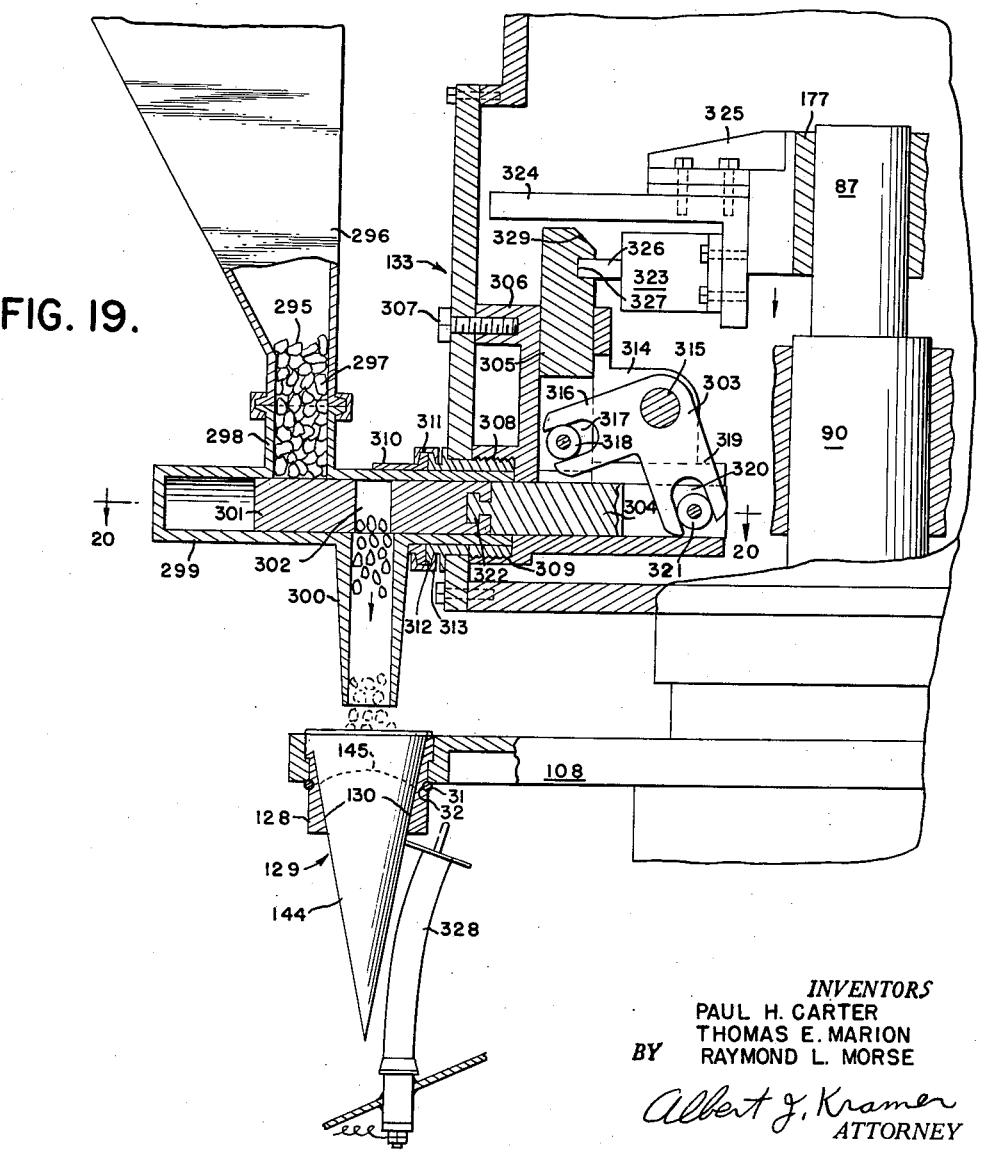
FIG. 19 (sheet 12) is a vertical sectional view of a portion of the head and turret showing parts of the nut dispenser with the mechanism in the discharged position.
Figure 23:
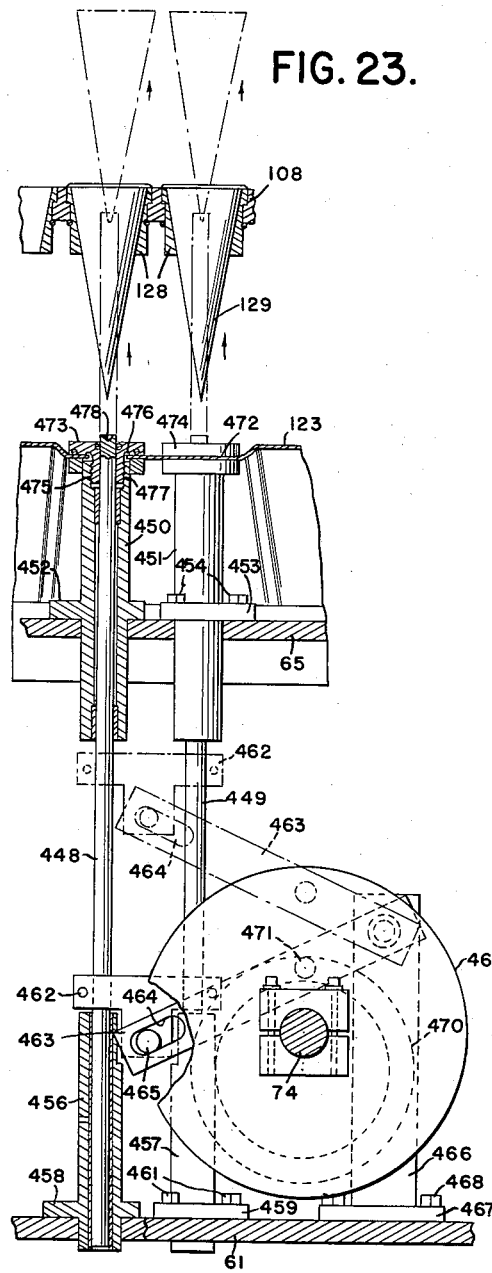
FIG. 23 (sheet 14) is a section along the line 23—23 of FIG. 22.
Figure 22:
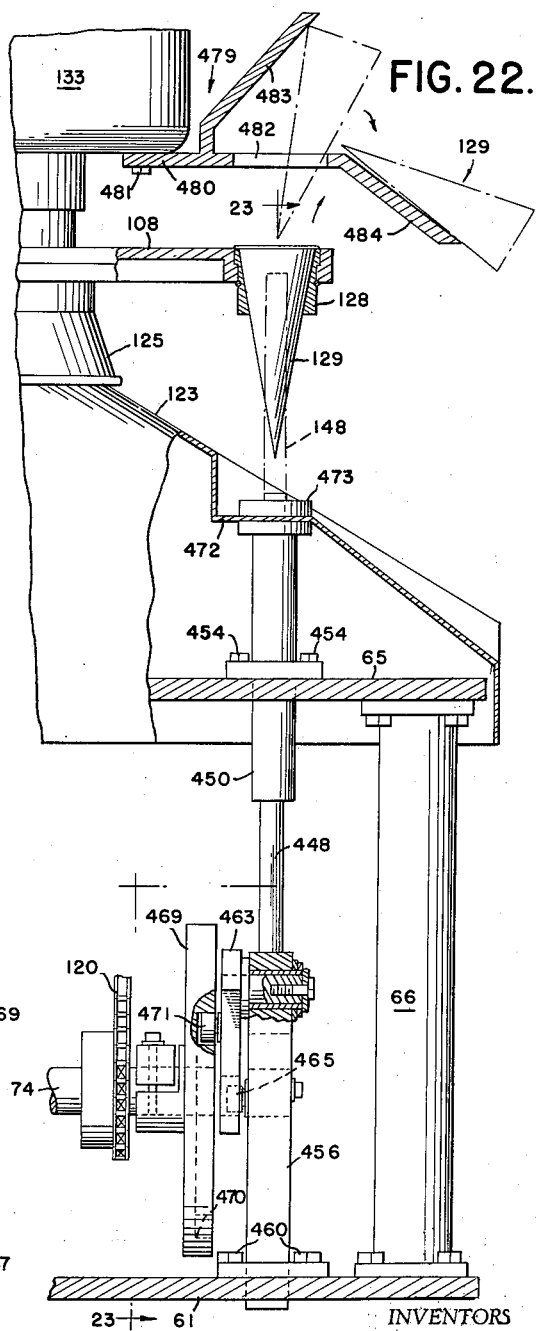
FIG. 22 (sheet 14) is a vertical view of a portion of the machine, partly in section, showing ejection mechanism and appurtenant parts.

The housing 204 has an outlet nozzle 215 at the bottom for the discharge of soft ice cream that is fed into the housing through a horizontal inlet 216 from a supply line 217. The plunger slides in a bushing 218 at the upper portion of the housing and is provided with a sealing ring 219 in an annular groove of the plunger. The lower end of the nozzle 215 is somewhat constricted to form an annular seat 220 for the tapered lower end 221 of the plunger, substantially as shown. (See FIG. 14.)

Above the nozzle 215 an annular gutter 222 is provided having a vertical lip 223. The purpose of this arrangement is to collect condensation of moisture in the air forming on the outside of the housing by virtue of the cold ice cream flowing therethrough and lowering the ambient temperature to below the dew point. This water of condensation would, otherwise, flow downwardly and fall into the receptacles along with the ice cream where subsequent freezing of the water therein would degrade the product.

Water collecting in the gutter 222 is continuously withdrawn by a suction line 224 connected to an outlet tube 225 on the outside of the lip 223. The tube 224 communicates with the inner side of the lip through an aperture 226.

The solenoids 190 are operated automatically through a double acting micro-switch 443 carried on a stationary bracket 440 attached to one of the stanchions 66 by means of a clamp 66a. The micro-switch is disposed in the path of movement of the outer end of the arm 161, whereby on each downward stroke of the shaft 90 the plungers 200 are lifted and then lowered relative to the nozzle housing each time the shaft 183 is in its lowermost position to discharge a quantity of ice cream in each receptacle supported therebelow on the wheel.

Chocolate Dispensers

The next operation of the series to be described herein is the dispensing of the chocolate syrup onto the ice cream that has been deposited into the receptacles.

Twin chocolate dispensers are provided and they are mounted on a horizontal section 227 of the crown 133. Each of these dispensers comprises a vertical tubular housing 228 disposed in a vertical aperture 229 in an enlarged portion 230 of the section 227. The upper end of the housing 228 is threaded to receive a holding nut 231 and a flanged portion 232 of the housing abuts the bottom of the portion 230 in the holding position.

Within each tubular housing 228 there is disposed a plunger 233 having an axial bore 234.

The lower portion of the plunger has an enlarged portion 235 which reciprocates in an enlarged opening 236 of the housing. A washer 237 is disposed between the portion 235 and a shoulder 238 formed in the housing by the enlarged opening 236.

To the bottom of the housing 238 there is removably connected by means of a flange clamp 239, similar to flange clamp 205, a vertical tubular section 240 and into which the lower end of the plunger 233 extends. A piston assembly 241 is disposed at the lower end of the plunger 233 and is slidably engaged with smooth interior walls 242 of the section 240. The piston is removably secured to the plunger by means of an elongated bolt 243, the head 244 of which abuts the piston assembly and the shank of which passes upwardly through the bore 234. A nut 245 secures the bolt to the plunger. The plunger 233 is biased to its uppermost position by means of a coil spring 246 disposed in compression between the bolt head 244 and a spring retainer well 247 formed in an annular member 248 below the section 240.

A spring alignment pin 249 is integral with the bolt 243 and it projects axially from the lower end thereof for a distance corresponding to the length of the spring under maximum compression.

The member 248 has a central aperture 250 in alignment with a larger aperture 251 in a plate 252 below the member 248. The aperture 251 contains a ball 253 which is larger than the aperture 250, thereby acting as a check valve which is closed in the uppermost position of the ball 253 by a coil 253A (see FIG. 10) and open in the lower position (see FIG. 11).

A perforated spreader plate 254 is disposed on the bottom of the plate 252, the perforations thereof constituting outlets for the liquid chocolate. The bottom surface 255 of the plate 252 is concave to allow the chocolate to flow freely to the perforations of the plate 254.

The plates 254, 252 and the member 248 are held in a cylindrical retainer 255, the upper end of which has an outward flange 256 corresponding to a flange 255 of the lower end of the section 240 and removably clamped thereto by a flange clamp 256 of a type similar to clamp 205.

The lower end of the retainer 255 has an inner flange 257 which engages a peripheral recess at the bottom of the plate 254.

Below the piston 241 there is formed integral with the section 240 a tubular inlet branch 258. Within this inlet branch there is provided a check valve of any standard type comprising a ball 259 and biasing spring 260 in relation to a ball seat 261. An inlet pipe 262 from a source of chocolate syrup is connected to the other end of the inlet branch 258 by means of another flange clamp 263 of the type previously described.

Figure 10:
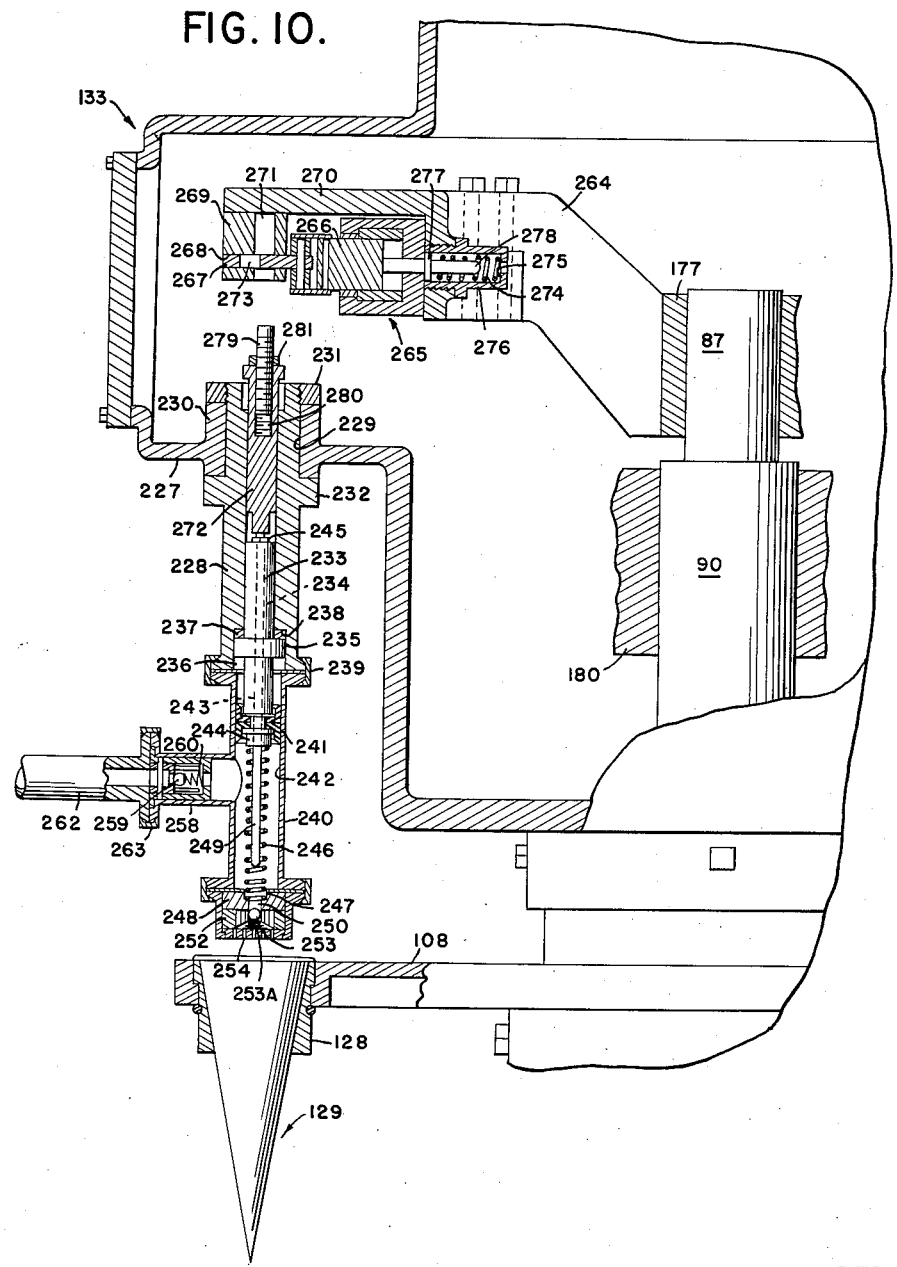
FIG. 10 (sheet 8) is a vertical sectional view of a portion of the head loading wheel showing parts of the fluid topping dispensing means on a larger scale.
Figure 11:
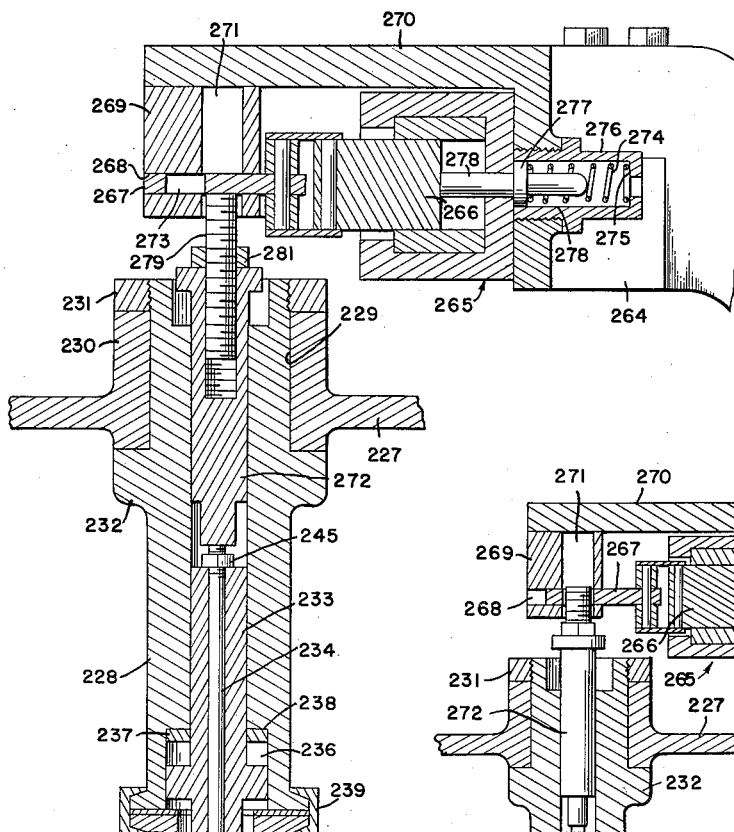
FIG. 11 (sheet 9) is a further enlarged view of dispenser portions of FIG. 10, apart from the loading wheel, and with the dispenser plunger under actuation.

When the plunger 233 moves downwardly as shown in FIG. 11, from its upward position shown in FIG. 10, the ball 253 is unseated from the bottom of the aperture 250 and chocolate syrup in the tubular section 240 below the piston 241 is forced out through the apertures in the plate 254. When the piston 241 is then moved upward, the ball 253 seats against the bottom of the aperture 250 and the check valve in the branch 258 opens to admit a fresh supply of the syrup. The cycle is then repeated.

Figure 12:
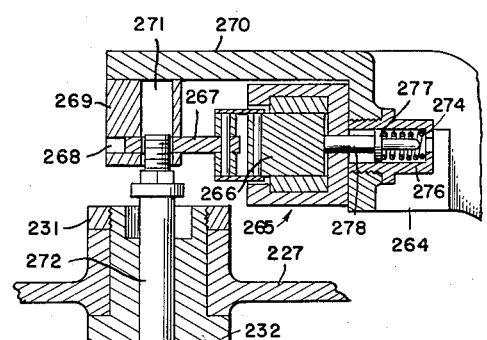
FIG. 12 (sheet 9) is a side elevational view, partly in section, of the same dispenser and unit on a smaller scale, with the plunger in released position.

The upward stroke of the plunger is effected by the spring 246. The downward stroke is effected by the downward movement of the inner shaft 87 through an arm 264 projecting radially from the hub 177. This arm carries a pair of plunger operators, one for each plunger 233, each operator comprising a solenoid 265 having a horizontally reciprocable armature 266. The armature is connected to a slide bar 267 for horizontal movement therewith. The bar 267 is slidably disposed in a horizontal slot 268 of a member 269 secured to and projecting downwardly from an extension 270 of the arm 264 overlying the plunger 233. The member 269 is provided with a vertical aperture 271 in axial alignment with a vertical rod 272 slidably disposed in the housing 228 above the plunger 233. The bar 267 is also provided with an aperture 273 which is in alignment with the aperture 271 when the solenoid 265 is energized to retract the armature 266 as shown in FIG. 12. The armature, however, is normally urged to the protracted position, as shown in FIGS. 10 and 11, by means of a coil spring 274 between the end wall 275 of a spring cup 276 and a flange 277 of an armature pin 278.

In this normal position of the armature 266, the aperture 273 is displaced relative to the aperture 271, whereby on each downward stroke of the arm 264, the upper end of a pin 279 is contacted by the bar 267 and forced downward, as shown in FIG. 11. The pin 279 is threadedly engaged with an aperture 280 in the upper end of the rod 272 and is held in positions of vertical adjustment thereon by a lock nut 281. The length of the effective stroke of the plunger can be adjusted by thus changing the vertical position of the pin 279.

The solenoid arrangement permits moving the bar 267 to align the apertures 273 and 271 and thereby prevent downward actuation of the plunger. This condition is effected when there is no receptacle in the loading wheel 108 below the corresponding chocolate dispenser, such as when the machine is starting or ending a run or where a particular run is interrupted for some reason. The electrical circuit for accomplishing this action includes a form of flexible electrical conductor post element 282 comprising a resiliently flexible tube 283 of an electrical insulating material containing on its inside an electrical wire 284 connected to a metal cap 285 and a metal foot plug 286. From the lower end of the plug 286 a shaft 288 projects downwardly through a base member 291.

One of such elements 282 is mounted on the roof 123 at each chocolate syrup station in alignment with the path of travel of the inner edge of the adapters 128 as they revolve with the loading wheel 108. The head 285 is provided with a flange 289 just below the path of travel of the bottom edges of the adapters but of a diameter sufficiently large to contact the receptacles 129 in the adapters as they move around and prevent contact of a pin 290 on the head 285 with adapter. (See FIG. 1.) If no receptacle 129 is in a particular adapter, such contact is effected and an electrical circuit is completed thereby to energize the solenoid 265 and hence cause a retraction of the bar 267, the circuitry for this operation being shown in the electrical digram of FIG. 41. The base 291 is disposed through the roof 123 part way in a vertical position and welded to the roof. Electrical insulating inserts 292 and 293, flanged at their outer ends, support the shaft 288 in the base 291. A rubber collar 294 is disposed between the foot plug 286 and the insert 292 and serves also to support the tube 283. The lower end of the shaft 288 is an electrical terminal for a wire 294A of the circuit. It is threaded to receive an assembly nut 287 and a wire holding nut 294B. The lower end of the wire 284 is removably attached to the foot plug by means of a banana plug 294C in a socket 294D of the plug 286.

The Nut Dispensers

The next operation performed by the embodiment illustrated comprises the dispensing of crushed nuts 295 from a hopper 296 having a pair of outlet throats 297 connected to inlet stems 298 of horizontal casings 299.

The casing 299 are provided with vertical tubular outlets 300 projecting downwardly to overlie the corresponding receptacle stations. Each casing contains a reciprocating plunger 301 which has a vertical aperture 302 therethrough. At the innermost position of the plunger 301 the aperture 302 is in vertical alignment with the outlet 300 and at the outermost position is in alignment with the inlet 298. Thus, the aperture 302 as the plunger 301 reciprocates is first filled with a given quantity of nuts from the hopper 296 which is then discharged through the outlet to a receptacle below on the loading wheel. The plunger 301 is reciprocated by vertical motion of the shaft 87 through a bell crank 303, horizontal connecting arm 304, and cross-head 305. The cross-head 305 is slidably mounted for vertical reciprocation on a bracket 306 secured to the inner wall of the crown 133 by bolts 307 and by a hollow nut 308 surrounding the inner end of the casing 299 and threadedly engaged with an aperture 309 of the bracket. The casing 299 is slidably engaged with the nut, but it is securely held thereto by means of a sleeve 310 welded to the casing and having a flange 311 abutting an end flange 312 of the nut, these flanges being removably coupled by a quick opening clamp 313, similar to clamp 205.

The bracket 306 includes a lobe 314 to which the bell crank 303 is pivotally connected by a pin shaft 315. The horizontal arm 316 of the bell crank has a slot 317 which engages a pin 318 of the cross head 305. The vertical arm 319 of the bell crank has a slot 320 which engages a pin 321 of the horizontal connecting arm 304. The arm 304 is connected to the plunger 301 by means of T-shaped projection 322 at the end of the arm 304 engaging a corresponding T-slot in the adacent end of the plunger 301. This permits a rapid disassembly and reassembly for cleaning purposes when the flanges 311 and 312 are uncoupled and the casing 299 pulled out.

The shaft 87 is connected to the cross head 305 by means of a solenoid 323 which is bolted to an angle bracket 324 carried by an arm 325 projecting from the hub 177. The armature 326 of this solenoid is normally extended to engage a slot 327 in the cross head. However, when there is no receptacle beneath the outlet 300, an electrical circuit is closed by means of switch element 328, similar to element 282, which effects retraction of the armature and prevents actuation of the cross head 305. Thus, no nuts could be dispensed. When normal conditions are restored, the armature 326 is extended and the outer end thereof latches into the slot 327. A corner of the cross head is provided with a beveled edge 329 to facilitate this latching operation should the armature be extended in a position above the cross head.

Closing Operation

The next function of the machine is to insert a closure member or lid in the top of the receptacle and seal it in place. The closure members are preferably in the form of a circular disc 330 with annular end flange 331. The mutually contacting surfaces of the flange and receptacle body are impregnated or coated with a thermoplastic bonding material, such as polystyrene resin, and it is this bonding material which is used to seal the closure member in place.

Stacks of the lid members are carried in a pair of vertical tubular holders 332 and 333, the bottom openings of which are restricted in size by flanges (see FIG. 26) to hold the weight of the stack, but permitting the bottommost disc in the stack to be flexed thereagainst and removed by a downward force.

The removal of these discs is effected by vacuum platens 334 and 335 at the outer end of a pair of hollow arms 336 and 337, respectively. These arms are hollow and communicate through channels 338 and 339 of the disc with apertures 340 and 341 at the top of the platens, respectively.

The inner ends of arms 336 and 337 are attached to a cup 341A secured to the bottom of a hollow post 342. This post extends upward through a sleeve 343, then through a bushing 344 in a bracket 345 attached to an inner rib 346 of the crown 133. The upper end of the post 342 is fixed to a cross bar 347. The upper end of a vertical bar 348 parallel to the post 342 is also secured to the cross bar 347 and it is slidably disposed in another bushing 349 of the bracket 345. The lower end of the bar 348 carries a pin 350 for engaging the slot 351 at one end of a lever 352. The other end of the lever is connected by a pin 353 to an arm 354 of the hub 177 or shaft 87. The lever 352 is fulcrumed to vertical portion 355 of the bracket 345 by means of a pin 356 engaging the slot 351.

The sleeve 343 is secured to an arm 357 of hub 180 by a post clamp 358 and also to the inner end of an upper arm 359 by a similar post clamp 360. The outer end of the arm 359 is secured to a pair of hollow vertical shafts 361 and 362 by clamps 361A and 362A which shafts extend downward through bushings in a horizontal wall section 363 of the crown 133, such as bushing 364 of the shaft 361.

The vertical movement of the inner shaft 87 is thus effective to move the vacuum platens 334 and 335 between and upper position (see dotted lines of FIG. 26) adjacent the lowermost lids in the stacks 332 and 333, respectively, where the vacuum can suck off these lids, to a lowermost position (see full lines of FIG. 26) where the lids are transferred to transfer arms 365 and 366.

The inner ends of said transfer arms are secured to oscillating vertical shafts 367 and 368. Pinion gears 369 and 370 are secured to these shafts, respectively. A horizontal rack 371 meshes with gear 369 and with an idler or reversing gear 372 that in turn meshes with the opposite gear 370. By these means, translation of the rack 371 results in simultaneously oscillating the shafts 367 and 368 and the arms 365 and 366 in opposite directions. The arc of oscillation of the transfer arms is, in each case, between the position of the corresponding vacuum platen and the corresponding adjacent receptacle station for application of the lid. The outer ends of the transfer arms are each in the form of an open ring 369A, 370A, the openings, 371A and 372A, respectively, being on the inner side of the ring to provide clearance for the arms 336 and 337.

Figure 24:
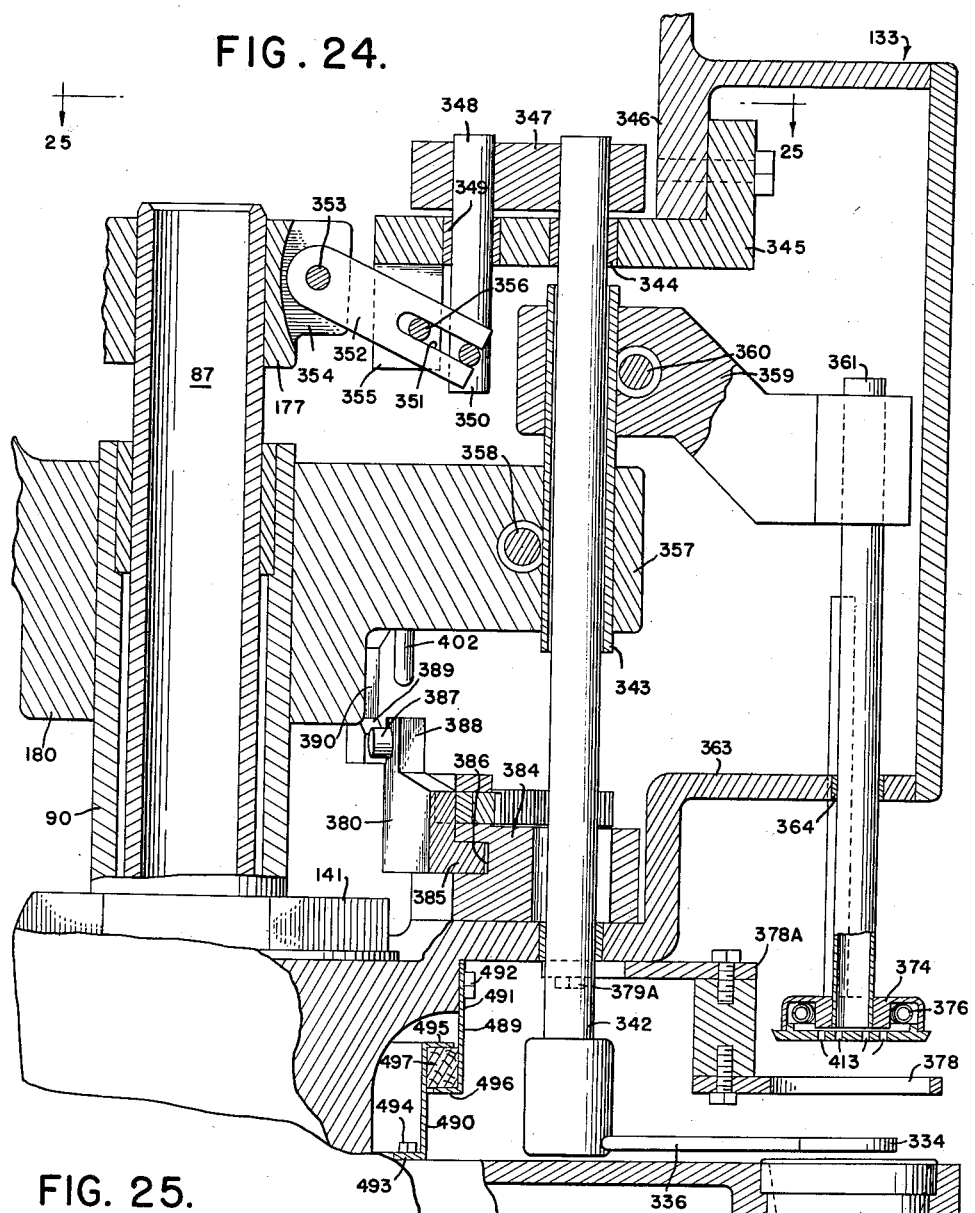
FIG. 24 (sheet 15) is a vertical sectional view through a portion of the head and loading wheel showing parts of the lid transfer and application mechanism.
Figure 25:
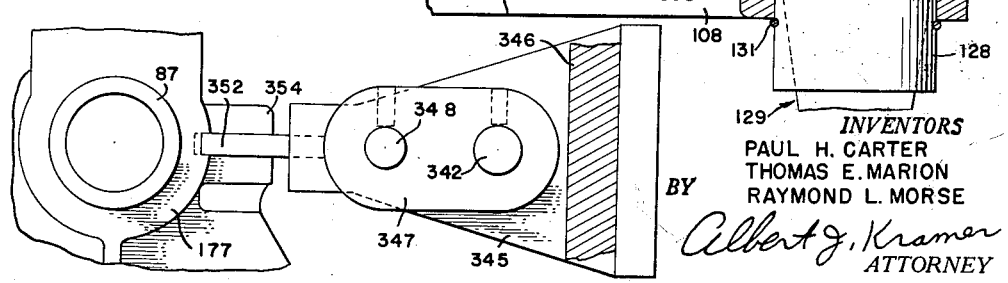
FIG. 25 (sheet 15) is a plan sectional view along the line 25—25 of FIG. 24.

The sequence of motion is such that the arms 365 and 366 move outwardly when the vacuum platens 334 and 335 are in their uppermost position to receive the lids from the stacks. The platens then move downwardly and pass the lids to the insides of the rings 369A, 370A. The inner walls of the rings are provided with grooves, such as the groove 373 in the ring 369A, to engage and hold the outer edges of the lid flanges 331. (See FIG. 33.) The vacuum is then broken, permitting the platens to move farther downwardly clear of the rings and lids, whereupon the transfer arms 365 and 366 move to their innermost positions over the corresponding receptacle stations. Sealing irons 374 and 375 attached to shafts 361 and 362, then descend over the lids held by the rings 369A, 370A, strip them from the rings and retaining them meanwhile by vacuum means hereinafter more fully described. The sealing irons move downward into position in the upper ends of the receptacles 129. These irons each contain an electrical heating element, such as the heating element 376 (see FIG. 24) shown in association with the sealing iron 374. When the lids are thus sealed in place, the vacuum is broken at the sealing irons and they are elevated. Stripper rings 377 and 378 as a unit, formed in a single plate, are disposed between the transfer rings 369A, 370A, on the one hand, and the upper ends of the adapters 128. They are bolted to an offset bracket 378A and function to disengage the receptacles from the sealing heads should there occur any insipient sticking between them as a result of the opera. ion. The bracket 378A is secured to the crown 133 by bolts 379A.

The rack 371 is secured to a vertical slide plate 380 by a screws 381 and 382 passing through an opening 383 of a mounting block 384. The plate 380 has a horizontal lip 385 slidably engaged with a groove 386 in the block 384. A cam roller 387 is carried by an upper projection 388 on the plate 380 to engage a diagonal camming surface 389 at the bottom of a pendant 390 of the arm 357. Thus, on the upward movement of the arm 357, the cam roller 387 forces the plate 380 to move to the right, as viewed in FIG. 28. During this movement of the rack, a spring 392 is compressed, it being mounted between spring retainer wells 393 and 394 of the slide plate 380 and a stationary bracket 395. This bracket is secured to the block by bolts 396.

Figure 28:
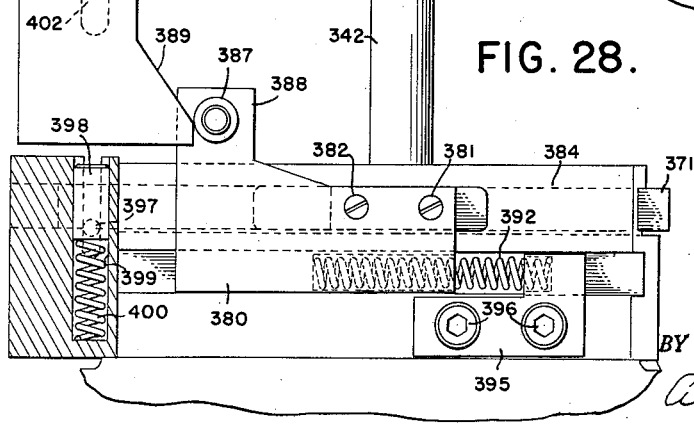
FIG. 28 (sheet 17) is a sectional view along the line 28—28 of FIG. 27.

When the rack reaches the fartherest position of its travel toward the right as viewed in FIG. 28, it is locked in position by a horizontal pin 397 connected to an extending from a vertical floating cylinder 398, the outer end being slidably disposed in a vertical holding slot 384A in the block 384. The cylinder is slidably mounted in a spring well 399 in the block 384 over a coil spring 400 and the pin 397 lies in a groove 401 of the rack 371. In the said fartherest position of travel of the rack to the right as seen in FIG. 28, the pin 397 is elevated with the cylinder 393 under the action of the spring 400 to fall into the groove 401 at the bottom of the rack 371. This has the effect of preventing relative movement between the rack and the block 384 upon disengagement of the cam roller 387 and cam surface 389 when the pendant 390 continues to move upward. On the downstroke of the pendant, a vertical pin 402 aligned with the well 399 and adjustably secured to the arm 357 by adjusting nuts 403 and 404, enters the well and forces the cylinder downward against the action of the spring 400. (See FIG. 32.)

Thus, the pin 397 is disengaged from the rack 371 and the spring 392 quickly returns the rack to its opposite position. Whereupon, the cycle of operation is repeated.

A source of vacuum or of subatmospheric pressure is communicated with the interior of the arms 336 and 377 through tubes 405 and 406 disposed within the hollow vertical post 342. The tubes 405 and 406 are connected to a pair of valves 407 and 408, respectively, illustrated schematically in FIG. 41. These valves are opened by solenoids 409 and 410 and closed by springs 411 and 412. Similarly, the sealing heads 374 and 375 have each holes 413 in their faces communicating with the interior of the hollow posts 361 and 362, and they are pneumatically connected to valves 414 and 415 by vacuum lines 416 and 417. The valves 407 and 414, operated to open position by solenoids 409 and 418 and to closed position by springs 411 and 420, are pneumatically connected together by a pipe 422 and valves 408 and 415 are pneumatically connected by pipe 423. The pipes 422 and 423 are connected pneumatically by a common connector pipe 424 which is in constant communication with a source of vacuum or subatmospheric pressure and the solenoids 409, 410 and 418 and 419 are connected electrically in an electrical circuit as shown in FIG. 41.

Referring with more particularity to FIG. 41, the solenoids 409, 410, 418 and 419 are each connected in series with a switch 424, 425, 426 and 427, respectively, normally biased to a closed position by springs 428, 429, 430 and 431, respectively. These switches are opened against the force of said springs by solenoids 432, 433, 434 and 435, respectively, in series with a flexible shielded conductor member 436, 437, 438 and 439, respectively, similar to the member 282 previously described in full, and which is normally held in disengageable position by the outward pressure of a receptacle 129 in an adjacent adapter 128.

A two-way switching unit 190A, having fixed contact members 441 and 442 on opposite sides of a movable contact member 190B is effective to close alternately, two circuits, one circuit comprising the solenoid 409 and switch 424 in parallel with the solenoid 410 and switch 425, the other circuit comprising the solenoid 418 and switch 426 in parallel with the solenoid 419 and 429. The unit 190A is attached to a vertically adjustable arm 190C of a bracket 190D in the crown 133 in the path of travel of the arm 325, whereby the member 190B is actuated on each stroke to de-energize one solenoid circuit and energize the other.

Thus, when the members 436, 437, 438 and 439 are held out of contact by the receptacles, the switches 424, 425, 426 and 427 will remain closed under the action of the springs 428, 429, 430 and 431. Accordingly, as each of the two circuits described above are energized, the valves 407 and 408 on the one hand, and the valves 414 and 415 on the other hand, are opened and closed as the switch element 190B moves to one side and then the other, to energize the two circuits alternatively and actuate the corresponding solenoids 409, 410, 418 and 419. However, should a receptacle be absent from an adapter, the corresponding flexible conductor member, say member 436, for example, would close the circuit in which it is contained, thus causing the solenoid 432 to become actuated to open the switch 424 and prevent the corresponding valve 407 from opening without affecting any of the other valves.

In the case of the solenoids 323 of the nut dispensers, they are in separate series circuits with a flexible conductor member 447, similar to the member 282.

Thus, when the circuit containing the member 447 is closed, the solenoid armature 336 is retracted to render the unit temporarily ineffective.

*Ejectors*

The final operation of the machine comprises ejecting the finished product from the wheel. This is accomplished by a pair of vertically reciprocating bars 448 and 449. The upper ends of these bars are slidably mounted in sleeves 450 and 451 secured by flanges 452 and 453 and bolts 454 and 455 to the upper plate 65. The lower ends of the bars are slidably disposed in sleeves 456 and 457 mounted on the lower plate 61 by means of flanges 458 and 459 and bolts 460 and 461.

The bars are co-reciprocated by means of a T-shaped crosshead 462 to which they are secured between the inner ends of the sleeves and a rocking beam 463. One end of the beam has a longitudinal slot 464 which slidably engages a wrist pin 465 of the cross head. The opposite end of the beam 463 is pivoted to the upper end of a stationary post 466 secured to the bottom plate 61 by means of a flange 467 and bolts 468. A cam plate 469 is disposed on the side of the beam 463 opposite the post 466 and it is provided with an eccentric groove 470 on the face thereof adjacent the beam. A cam roller 471 is carried by the beam and is engaged with the said groove.

The cam plate 469 is driven by the same output shaft 74 of the speed reducer 68 as the cam plates 78 and 79.

The upper ends of the upper sleeves 450 and 451 are securely positioned in a horizontal formation 472 of the hood 123 by means of clamping heads 473 and 474 having threaded necks passing through apertures of the formation and engaging threaded interior portions of the sleeves, such as the neck 475, through aperture 476 and threaded portion 477.

The sleeves 450 and 451 are in position relative to the loading wheel 108 such that the center of the rods 448 and 449 are aligned with the center of the adapters 128 below the receptacles therein. In the case of the conical receptacles 129 of the type illustrated, the upper ends of the rods are counterbored to provide a seat 478 for the apices of the receptacles. The sides of the seat, however, are concavely arcuate from top to bottom in order to permit the tips of the receptacles to slide thereover as they are lifted up out of the adapters and topple over.

A guide shield 479 is mounted by means of a flange 480 and bolts 481 to the crown 133. The bottom of this shield has openings 482 for the passage of the ejected articles, a pitched roof 483 for contacting the upper ends of the articles to thereby guide them outwardly over a discharge slide or chute 484 to a discharge point beside the machine.

Additional dispensers for other materials may also be provided, such as syrup dispenser units 485 similar to the chocolate dispenser units, for the purpose of placing a confectionary material such as liquified candy, at the bottom of the receptacles before introducing the ice cream. The units 485 are in all respects similar to the chocolate dispensers described above and they are mounted on an arm 486 of the hub 177 and have identical actuating members, including solenoids 487, like the solenoids 276 and similar flexible conductor post members 488, like the members 447.

A seal is provided between the crown 133 and the loading wheel 108. This seal comprises a pair of upper and lower vertical circular member 489 and 490. The upper member 489 is secured to an annular shoulder 491 of the crown 133 by bolts 492 and projects downwardly therefrom. The lower member 490 is inwardly offset from the member 489 and has a foot flange 493 attached to the wheel 108 by bolts 494.

The member 490 has an upper flange 495 extending toward the member 489 and the member 489 has a bottom flange 496 extending toward the member 490 below the flange 495. The space between the flanges 495 and 496 is filled with a strip of felt 497 or other suitable material to function as a seal between the members 489 and 490.

Having thus described our invention, we claim:

1. A machine for manufacturing confectionary products comprising a frame structure, a horizontal loading wheel rotatably carried by the frame structure, means for intermittently rotating said wheel, confectionary dispensing units carried by said frame structure in functional relation to said wheel, means for actuating said dispensers, said means including a shaft disposed through the center of the wheel, means for reciprocating the shaft, and means connecting the reciprocating shaft to the dispensers.

2. In a packaging machine, a hollow stationary post, a group of stationary materials dispensing units circularly arranged in spaced relation about said post, a horizontal wheel rotatably mounted on the post for supporting containers in positions adjacent the units to receive materials discharged therefrom, means for intermittently actuating said dispensing units to discharge for deposit in the containers predetermined quantities of the materials, said means comprising a vertical shaft slidably mounted for reciprocation in the hollow post, and means for intermittently reciprocating the shaft and alternatively rotating the wheel in an amount to change the position of the container to receive materials from different dispensing units of the group.

3. In a packaging machine, a hollow stationary post, a group of stationary materials dispensing units circularly arranged in spaced relation about said post, a horizontal wheel rotatably mounted on the post for supporting containers in positions adjacent the units to receive materials discharged therefrom, means for intermittently actuating said dispensing units to discharge for deposit in the containers predetermined quantities of the materials, said means comprising vertical shafts mounted for reciprocation in the hollow post and means for reciprocating the shafts relative to the post and relative to each other and for rotating the wheel stepwise about the post in an amount corresponding to the spaced relation of said dispensing units.

4. In a packaging machine having a support for an open container to be closed by a lid at a lid application station and having a supply station for thermally sealable lids; a thermal sealing iron for the lids, said iron being mounted at the lid application station for reciprocation between a non-operative position and operative position to engage lids to be heat sealed to the containers; a member at the sealing station for removing a lid from the supply station, means for receiving from the member and releasably holding and transferring the lid from the supply station to a position between the operative and non-operative positions of the sealing iron when the sealing iron is in the non-operative position, said means comprising an arm mounted for oscillation of a part thereof between the supply station and the application station, said part comprising a ring section larger than the sealing iron and having a projection on its inner side for releasably gripping the outer edge of a lid placed therein; and means for moving the iron from its non-operative to its operative position when a lid is disposed therebetween, whereby the iron engages the lid, carries it to the container and seals it thereto.

5. In a packaging machine as defined by claim 4 in which the member for removing the lid from the supply station comprises a horizontal tube mounted for reciprocation between the ring and a position above the ring, said ring having an opening therein adapted to be aligned with the path of movement of the said tube when the arm moves to its extreme position relative to the supply station.

6. In a packaging machine as defined by claim 5 and means for reciprocating said tube when the ring opening is aligned with the path of movement of the tube.

7. A packaging machine as defined by claim 2, means for applying lids to filled containers and sealing them thereto while the containers are disposed on the wheel, and means for removing the sealed containers from the wheel to a discharge station comprising a reciprocating rod below the wheel to contact the bottom of the sealed containers and elevate them above the wheel, a diagonal plate above the wheel to contact the containers as they are elevated by the rod and divert them outwardly toward the discharge station, and means between the plate and discharge station for receiving containers diverted by the plate and depositing them at the discharge station.

References Cited in the file of this patent

UNITED STATES PATENTS

| | | |
|---|---|---|
| 1,382,141 | Stickels | June 21, 1921 |
| 1,734,108 | Bergmann et al. | Nov. 5, 1929 |
| 1,850,522 | Wessman | Mar. 22, 1932 |
| 1,931,246 | Barbieri | Oct. 17, 1933 |
| 2,187,190 | Wilcox | Jan. 16, 1940 |
| 2,717,112 | Ralston | Sept. 6, 1955 |
| 2,765,601 | Anderson | Oct. 9, 1956 |
| 2,897,643 | Byrd | Aug. 4, 1959 |
| 2,936,798 | Cummings et al. | May 17, 1960 |
| 2,972,216 | Schmidt | Feb. 21, 1961 |